(12) United States Patent
Tanaka

(10) Patent No.: US 7,953,952 B2
(45) Date of Patent: May 31, 2011

(54) COMPUTER AND METHOD FOR CONTROLLING WHETHER OR NOT TO RELEASE ALL REAL STORAGE AREAS ASSIGNED TO VIRTUAL VOLUME

(75) Inventor: Hiroyuki Tanaka, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 575 days.

(21) Appl. No.: 12/025,276

(22) Filed: Feb. 4, 2008

(65) Prior Publication Data

US 2009/0144732 A1 Jun. 4, 2009

(30) Foreign Application Priority Data

Nov. 29, 2007 (JP) ................... 2007-308417

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. .................. 711/203; 711/114; 711/154

(58) Field of Classification Search .................. 711/203, 711/114, 154
See application file for complete search history.

(56) References Cited

U.S. PATENT DOCUMENTS

| | | | |
|---|---|---|---|
| 2005/0091266 A1* | 4/2005 | Hasegawa | 707/103 R |
| 2006/0069862 A1* | 3/2006 | Kano | 711/114 |
| 2008/0147961 A1* | 6/2008 | Seki et al. | 711/100 |

FOREIGN PATENT DOCUMENTS

JP 2005-011316 A 1/2005

* cited by examiner

Primary Examiner — Kevin L Ellis
Assistant Examiner — Ryan Bertram
(74) Attorney, Agent, or Firm — Sughrue Mion, PLLC

(57) ABSTRACT

The management server performs a release/non-release selection determining whether or not to release all of the real storage areas assigned to a virtual volume switched from a used target to an unused target. The management server exercises control to determine whether or not to release all of the real storage areas assigned to the specified virtual volume in accordance with the result of the release/non-release selection.

16 Claims, 20 Drawing Sheets

FIG. 4

USER SET VALUE TABLE 11591

| STORAGE SYSTEM NUMBER | VOLUME NUMBER | USER SETTING STATUS | RELEASE TIME |
|---|---|---|---|
| 14053 | 01:01 | IMMEDIATE RELEASE | |
| 14050 | 03:0B | RELEASE AFTER A FIXED TIME | AFTER TEN MINUTES |
| 14052 | 05:03 | RE-USED | |
| 14050 | 08:18 | AUTOMATIC JUDGMENT | |
| : | : | : | : |

FIG. 5

VOLUME MANAGEMENT TABLE 11592

| STORAGE SYSTEM NUMBER | VOLUME NUMBER | TYPE | CAPACITY (TB) | REQUEST TIME | VOLUME STATUS |
|---|---|---|---|---|---|
| 14050 | 08:18 | VIRTUAL | 10 | 07/07/15 12:00:00 | RE-USED |
| 14052 | 05:03 | VIRTUAL | 5 | 07/07/25 19:00:00 | ASSIGNED |
| 14050 | 03:0B | VIRTUAL | 7 | 07/07/10 15:00:00 | CANDIDATE 1 |
| 14053 | 01:01 | VIRTUAL | 3 | 07/06/30 11:00:00 | RELEASE |
| 14051 | 07:02 | NORMAL | 6 | | MIGRATION SOURCE |
| : | : | : | : | : | : |

FIG. 6

REAL VOLUME MANAGEMENT TABLE 11593

| VIRTUAL VOLUME INFORMATION ||REAL VOLUME NUMBER|
|---|---|---|
| STORAGE SYSTEM NUMBER | VOLUME NUMBER ||
| 14050 | 08:18 | A1 |
| | | A2 |
| | | A3 |
| 14052 | 05:03 | B1 |
| | | B2 |

FIG. 7

MEASUREMENT TIME TABLE 11594

| TYPE | START | END |
|---|---|---|
| RESPONSE TIME | 07/04/20 12:30:00 | 07/04/27 17:15:00 |
| ACCESS FREQUENCY | 07/06/25 08:45:00 | 07/07/25 17:15:00 |

FIG. 8

ACCESS FREQUENCY ACCUMULATION TABLE 11595

| HOST IDENTIFIER | ACCESS FREQUENCY (NUMBER OF TIMES/MINUTE) |
|---|---|
| 001 | 70 |
| | 10 |
| | : |

FIG. 9

ACCESS FREQUENCY TABLE 11596

| HOST IDENTIFIER | ACCESS FREQUENCY AVERAGE VALUE (NUMBER OF TIMES/MINUTE) |
|---|---|
| 001 | 50 |
| 003 | 80 |
| : | : |

FIG. 10

RESPONSE TIME ACCUMULATION TABLE 11597

| STORAGE SYSTEM NUMBER | VOLUME NUMBER | TYPE | RESPONSE TIME (SECONDS/NUMBER OF TIMES) |
|---|---|---|---|
| 14050 | 08:18 | VIRTUAL | 0.2 |
| | | | 0.7 |
| | | | ⋮ |

FIG. 11

RESPONSE TIME TABLE 11598

| STORAGE SYSTEM NUMBER | VOLUME NUMBER | TYPE | RESPONSE TIME AVERAGE VALUE (SECONDS/NUMBER OF TIMES) |
|---|---|---|---|
| 14050 | 08:18 | VIRTUAL | 0.5 |
| 14052 | 05:03 | VIRTUAL | 0.1 |
| 14051 | 07:02 | NORMAL | 0.3 |
| ⋮ | ⋮ | ⋮ | ⋮ |

| VIRTUAL PAGE | REAL PAGE |
|---|---|
| VP#0 | Null |
| VP#1 | RVOL#3, RP#12 |
| VP#2 | RVOL#0, RP#8 |
| ⋮ | ⋮ |

12335

| VIRTUAL PAGE | REAL PAGE |
|---|---|
| VP#0 | Null |
| VP#1 | Null |
| VP#2 | Null |
| ⋮ | ⋮ |

12335

COMPUTER AND METHOD FOR CONTROLLING WHETHER OR NOT TO RELEASE ALL REAL STORAGE AREAS ASSIGNED TO VIRTUAL VOLUME

CROSS-REFERENCE TO PRIOR APPLICATION

This application relates to and claims the benefit of priority from Japanese Patent Application number 2007-308417, filed on Nov. 29, 2007 the entire disclosure of which is incorporated herein by reference.

BACKGROUND

The present invention generally relates to the control of a storage system which has a function for assigning real storage areas to virtual storage areas constituting a virtual volume.

A technology for dynamically assigning real storage areas to virtual storage areas which constitute a virtual volume which is a virtual logical volume is known (Japanese Patent Application Laid Open No. 2005-11316, for example). This technology is also called Thin Provisioning technology. The virtual volume is also known as a Thin Provisioning volume. According to Thin Provisioning technology, a storage system comprises a storage area pool. A storage area pool is an aggregate of one or a plurality of real volumes and is constituted by a plurality of real storage areas. The respective real storage areas are the constituent elements of a real volume. A real volume is a logical volume which is formed based on the storage space of one or a plurality of physical storage devices of the storage system (hard disk or flash memory, for example). Upon receipt of a write request designating a virtual storage area of the virtual volume from a higher level device (a host computer, for example), the storage system selects a real storage area from a plurality of unassigned real storage areas and assigns the selected real storage area to a virtual storage area designated by the write request. In addition, the storage system releases the assigned real storage area in cases where assignment of a real storage area is not required for a virtual storage area for which a real storage area has been assigned.

Because the virtual volume is switched from a used target to an unused target, the release of all the real storage areas which have been directly assigned to virtual volumes sometimes constitutes a problem for access performance. Cases which may be considered as cases where a problem can arise include, for example, a case where a virtual volume is the migration destination and a case where a virtual volume is assigned to a higher level device. The respective cases are described hereinbelow. In the following description, a logical volume which has an entity constituting a constituent element of a storage area pool is called a 'real volume' and a logical volume which has an entity which is not a constituent element of a storage area pool is called a 'normal volume'.

(1) Case Where the Virtual Volume is the Migration Destination

Migration is the migration of data from a primary logical volume ('PVOL' hereinbelow) to a secondary logical volume ('SVOL' hereinbelow). The PVOL is the migration source and the SVOL is the migration destination. The PVOL and the SVOL may exist in different storage systems or may exist in one storage system. When migration is performed, the access path linking the higher level device and access destination change. More specifically, prior to execution of the migration, the logical volume, which constitutes the access destination of the higher level device, is the PVOL. However, following completion of the migration, the logical volume which constitutes the access destination of the higher level device is the SVOL. That is, not only a data transfer but also a change to the access path is included in the migration processing.

In cases where the migration destination (that is, SVOL) is a virtual volume to which not a single real storage area has been assigned, each time migration of data elements takes place, it is necessary to assign a real storage area to the virtual storage area constituting the data element migration destination. Hence, there is the problem that the access performance (speed, for example) during migration drops in comparison with a case where the migration destination is a normal volume.

This problem is as detailed below when an example is described with reference to FIGS. 25A to 25C. For example, as shown in FIG. 25A, the real storage area (b) of a real volume 7103 has already been assigned to a virtual storage area (B) of the virtual volume 7102. In this state, as shown in FIG. 25B, in cases where the migration of data from the virtual storage area (B) to the storage area (C) of the normal volume 7104 is complete, the assignment of the real storage area (b) to the virtual storage area (B) is cancelled (that is, the real storage area (b) is released). Thereafter, as shown in FIG. 25C, in cases where data elements stored in the storage area (D) of the normal volume 7105 undergo migration to the virtual storage area (B) of the virtual volume 7102, because the real storage area (b) assigned to the virtual storage area (B) has already been released, an unassigned real storage area must again be assigned to the virtual storage area (B).

(2) Case Where a Virtual Volume is Assigned to a Higher Level Device

In cases where not a single real storage area has been assigned to the virtual volume assigned to the higher level device, each time there is a write request designating the virtual volume from the higher level device, there is a need to assign a real storage area to the virtual storage area designated by the write request. Hence, there is the problem that the write performance (speed, for example) drops.

This problem is as detailed below when an example is described with reference to FIGS. 26A to 26B. For example, as shown in FIG. 26A, a virtual volume 7202 is assigned to a first host 7201 and a real storage area (a) of a real volume 7203 is assigned to the virtual storage area (A) of the virtual volume 7202. Here, as shown in FIG. 26B, in cases where the assignment of the virtual volume 7202 to the first host 7201 is released, the real storage area (a) is released by the storage system. Thereafter, the virtual volume 7202 is assigned to a second host 7204. Not a single real storage area has been assigned to the virtual volume 7202. Hence, in cases where a write request designating the virtual storage area (A) is received from the second host 7204, the storage system must again assign an unassigned real storage area to the virtual storage area (A).

As mentioned hereinabove, because the virtual volume is switched from a used target to an unused target, the release of all the real storage areas which have been directly assigned to virtual volumes sometimes constitutes a problem for access performance. Hence, when the real storage areas are assigned as is indefinitely to virtual volumes which are unused targets, there is the risk that the unassigned real storage area will be inadequate.

SUMMARY

Therefore, an object of the present invention is to prevent a drop in the access performance and also to prevent a shortage of unassigned real storage areas.

Further objects of the present invention will become evident from the subsequent description.

A release/non-release selection which determines whether to release all the real storage areas that have been assigned to a virtual volume which has been switched from a used target to an unused target is carried out. Control with respect to whether or not to release all the real storage areas which have been assigned to a specified virtual volume is performed in accordance with the result of the release/non-release selection.

BRIEF DESCRIPTION OF THE DRAWINGS

FIG. 4 shows a constitutional example of a user set value table which is stored by the management server;

FIG. 5 shows a constitutional example of a volume management table which is stored by the management server;

FIG. 6 shows a constitutional example of a real volume management table which is stored by the management server;

FIG. 7 shows a constitutional example of a measurement time table which is stored by the management server;

FIG. 8 shows a constitutional example of an access frequency accumulation table which is stored by the management server;

FIG. 9 shows a constitutional example of an access frequency table which is stored by the management server;

FIG. 10 shows a constitutional example of a response time accumulation table which is stored by the management server;

FIG. 11 shows a constitutional example of a response time table which is stored by the management server;

DETAILED DESCRIPTION OF THE PREFERRED EMBODIMENTS

Figure 1:
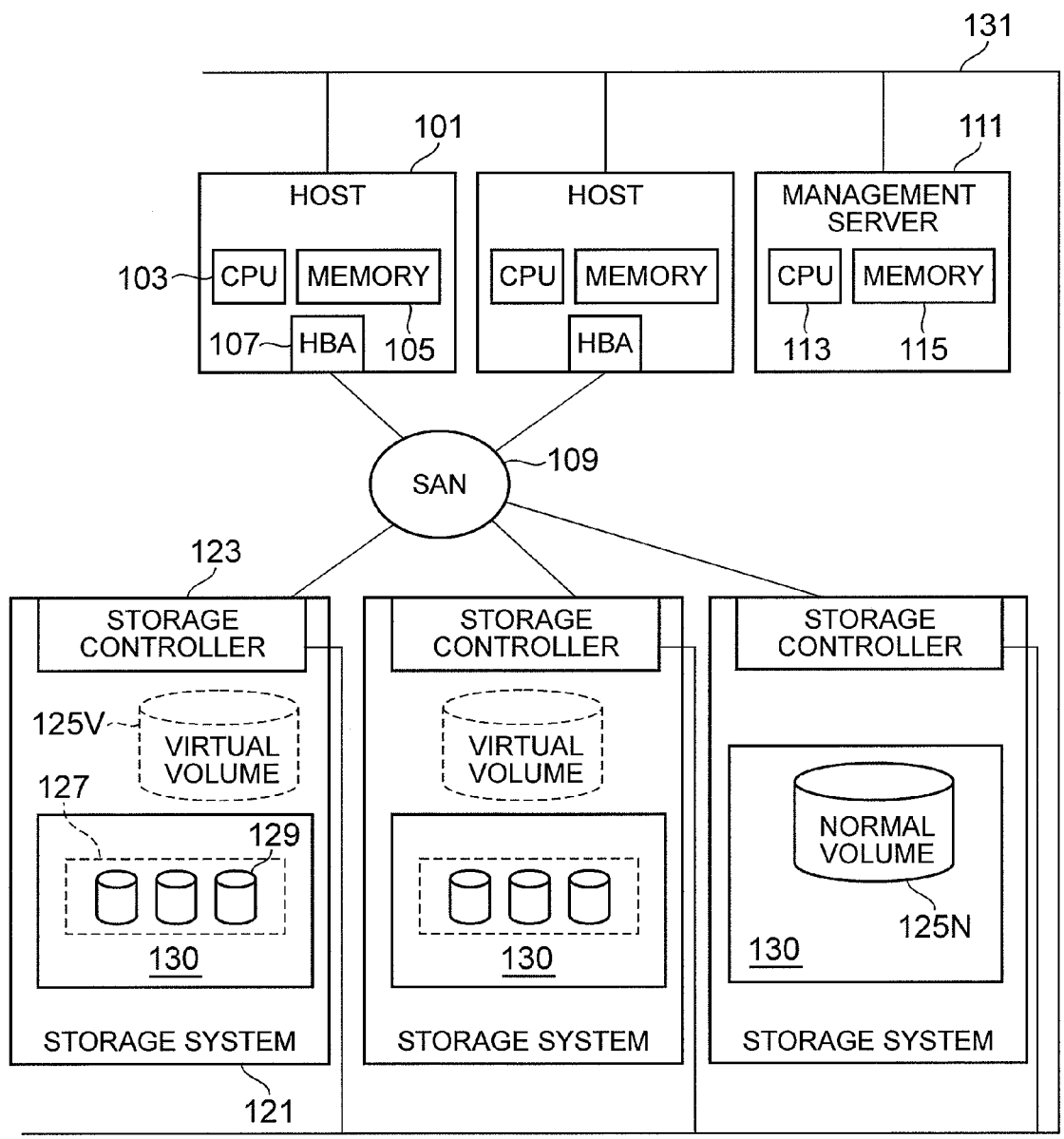
FIG. 1 shows a constitutional example of a computer system according to an embodiment of the present invention.

In Embodiment 1, a computer which manages a storage system having a function to assign a real storage area to a virtual storage area specified by an access request comprises a specification module, a release/non-release selection module, and a release/non-release instruction module. The virtual storage area specified by the access request is one of a plurality of virtual storage areas which constitute the virtual volume. The assigned real storage area is an unassigned real storage area which has not been assigned to any virtual storage area among a plurality of real storage areas which constitute a storage area pool constituted by one or a plurality of real volumes. The virtual volume is a virtual logical volume. The real volume is a logical volume which is formed on the basis of the storage space of one or a plurality of physical storage devices of the storage system. The specification module specifies a virtual volume which is switched from a used target to an unused target. The release/non-release selection module performs a release/non-release selection determining whether or not to release all of the real storage areas assigned to the specified virtual volume. The release/non-release instruction module creates a release/non-release instruction for controlling whether or not the storage system releases all of the real storage areas assigned to the specified virtual volume in accordance with the result of the release/non-release selection and transmits the created release/non-release instruction.

A virtual volume in cases where migration is complete which is the migration source virtual volume in the migration of data to and from a logical volume, for example, can be adopted as the 'virtual volume which is switched from a used target to an unused target'. Furthermore, a virtual volume whose assignment to a higher level device has been cancelled can be adopted, for example. A variety of devices such as a host computer or another storage system, for example, can be adopted as a higher level device.

In Embodiment 2 according to Embodiment 1, the computer further comprises a virtual volume selection module. The virtual volume selection module selects a virtual volume which constitutes an assignment target from a plurality of virtual volumes on the basis of whether the virtual volume is a virtual volume for which all of the real storage areas have been released.

In Embodiment 3 according to Embodiment 2, the virtual volume which is the assignment target is the virtual volume (A) or (B) below:

(A) an assignment target virtual volume as the migration destination of data which are stored in a migration source logical volume; and (B) an assignment target virtual volume for a higher-level device which issues an access request to the storage system.

In Embodiment 4 to Embodiment 3, the virtual volume selected as the virtual volume (A) conforms to condition (A1) and (A2) below:

(A1) all of the assigned real storage areas have not been released; and (A2) the virtual volume has a storage capacity equal to or greater than the storage capacity of the migration source logical volume.

In Embodiment 5 according to Embodiment 4, the virtual volume which is selected as the virtual volume (A) also conforms to condition (A3) and/or (A4) below:

(A3) the virtual volume has a volume performance which is as close as possible to the volume performance of the migration source logical volume; and (A4) the time the virtual volume was switched from the used target to the unused target is the oldest.

In Embodiment 6 according to Embodiment 5, the volume performance of a certain logical volume is a value which is calculated on the basis of a plurality of response times for the certain logical volume (a value which is calculated by means of another computational equation which takes the average value or a plurality of response times as its elements, for example). The response time for the certain logical volume is a time interval which extends from the time the request designating the certain logical volume is issued until receipt of a response.

In Embodiment 7 according to Embodiment 3, the virtual volume selection module prioritizes the selection of a virtual volume for which all of the assigned real storage areas are released in cases where a virtual volume which is assigned to a higher level device with a low access frequency is selected and prioritizes the selection of a virtual volume for which all of the assigned real storage areas have not been released in cases where a virtual volume which is assigned to a higher level device with a high access frequency is selected.

In Embodiment 8 according to any of Embodiments 2 to 7, the virtual volume selection module judges whether automatic selection or user selection of the virtual volume is implemented. In cases where automatic selection is implemented, the virtual volume selection module selects a virtual volume which constitutes an assignment target from a plurality of virtual volumes on the basis of whether the virtual volume is a virtual volume for which all of the real storage areas have been released. In cases where user selection is implemented, the virtual volume selection module displays a status which relates to whether all of the real storage areas are released for the respective virtual volumes and selects a virtual volume which is designated by an administrator in response to the display of the status of the respective virtual volumes as the assignment target virtual volume.

In Embodiment 9 according to any of Embodiments 1 to 8, the release/non-release selection module performs a release/non-release selection determining whether or not to release all of the real storage areas assigned to the specified virtual volume on the basis of the usage status prior to switching the specified virtual volume to an unused target.

In Embodiment 10 according to any of Embodiments 1 to 9, the release/non-release selection module performs a release/non-release selection determining whether or not to release all of the real storage areas assigned to the specified virtual volume on the basis of the performance of the real volume which comprises the real storage areas assigned to the specified virtual volume.

In Embodiment 11 according to any of Embodiments 1 to 10, the release/non-release selection module performs a release/non-release selection determining whether or not to release all of the real storage areas assigned to the specified virtual volume on the basis of the performance of the specified virtual volume.

In Embodiment 12 according to any of Embodiments 1 to 11, the release/non-release selection module performs a release/non-release selection determining whether or not to release all of the real storage areas assigned to the specified virtual volume on the basis of the number of unassigned real storage areas.

In Embodiment 13, the storage system comprises the specification module, the release/non-release selection module, and the release/non-release control module. The release/non-release control module controls whether the storage system releases all of the real storage areas assigned to the specified virtual volume in accordance with the result of the release/non-release selection.

At least one of the specification module, release/non-release selection module, release/non-release instruction module, virtual volume selection module, and release/non-release control module can be constructed by hardware or a computer program or by a combination thereof (some of these constituent parts can be implemented by a computer program while the remaining parts are implemented by hardware, for example). The computer program is read to a predetermined processor and executed by same. Further, during information processing in which the computer program is read to the processor and executed thereby, a storage area which exists in the memory or in other hardware resources may be suitably employed. In addition, the computer program may be installed on a computer from a recording medium such as a CD-ROM or may be downloaded to the computer via a communication network.

An embodiment of the present invention will be described in detail hereinbelow with reference to the drawings. Thereupon, in order to facilitate understanding of the description, the main body of the processing which is performed as a result of the CPU reading and executing the computer program is sometimes a computer program without the CPU.

FIG. 1 shows a constitutional example of a computer system according to an embodiment of the present invention.

A plurality of host computers 101 (or one thereof) and a plurality of storage systems 121 (or one thereof) are connected to a first communication network such as a SAN (Storage Area Network) 109, for example. In addition, a plurality of host computers 101 (or one thereof), a plurality of storage systems 121 (or one thereof) and a management server 111 are connected to a second communication network such as a LAN (Local Area Network) 131, for example. The first and second communication networks may also be integrated with one another rather than being separated in this way.

The host computer 101 is a computer device that comprises information processing resources such as a CPU (Central Processing Unit) 103, a memory 105, and an HBA (host bus adapter) 107, for example, and is constituted as a personal computer, a work station, or a mainframe or the like, for example. The host computer 101 is able to access the logical volume by issuing an access request (a write request or read request, for example) which designates a logical volume that is supplied by the storage system 121.

The management server 111 is a computer device that comprises information processing resources such as a CPU (Central Processing Unit) 113 and a memory 115, for example. The management server 111 is able to control whether or not to cancel all the real storage areas which have been assigned to a desired virtual volume by transmitting an instruction on whether or not to cancel all the real storage areas assigned to the virtual volume (an instruction which designates the desired virtual volume) to the storage system 121. Furthermore, the management server 111 is able to display the desired information by means of a method which displays information on a display device (not shown) which the management server 111 comprises or which displays the information on a remote terminal which is capable of communicating with the management server 111 by transmitting this information to the remote terminal.

The storage system 121 comprises a physical storage device group 130 and a storage controller 123. The physical storage device group 130 is an aggregate of a plurality of physical involatile storage devices (hard disks or flash memory units, for example). A logical volume which has an entity that is formed on the basis of the storage space of the physical storage device group 130 and/or a virtual logical volume (virtual volume) which does not have an entity are supplied to the host computer 101 by the storage controller 123. Among the logical volumes which have an entity, the logical volumes which constitute the storage area pool 127 are known as 'real volumes' and the logical volumes which do not constitute the storage area pool 127 are called 'normal volumes'. In cases where a write request designating a storage area in the normal volume 125N is received from the host computer 101, the storage controller 123 writes write-target data elements to the storage area. However, the storage controller 123 writes write-target data elements by means of the method described with reference to FIG. 24A in cases where the write request designating a virtual storage area in the virtual volume 125V is received from the host computer 101.

That is, the storage controller 123 selects an unassigned real storage area 1129 from a plurality of real volumes 129 which belong to the storage area pool 127 and assigns the selected real storage area 1129 to a virtual storage area 1125 in the virtual volume 125V which is specified by the received write request. The storage controller 123 then writes write-target data elements to the assigned real storage area 1129. In the following description, the storage areas which are the assignment units are expediently called 'pages'. More specifically, the real storage areas which are the assignment source (the constituent elements of the real volume 129) are called 'real pages' and the virtual storage areas which are the assignment destination (the constituent elements of the virtual volume 125V) are called 'virtual pages'. Real pages and virtual pages are the same size and one real page is assigned to one virtual page.

A certain real page is assigned to a certain virtual page as a result of a mapping table 12335 (see FIG. 24B) which indicates which real page has been assigned to which virtual page being updated with information indicating that a certain real page has been assigned to a certain virtual page by the storage controller 123. For example, in the mapping table 12335, in cases where a real page ID "RVOL #3, RP #12" is associated with a virtual page ID "VP #1", a real page (RP #12) in the real volume (RVOL #3) comes to be assigned to a virtual page (VP #1).

Figure 2:
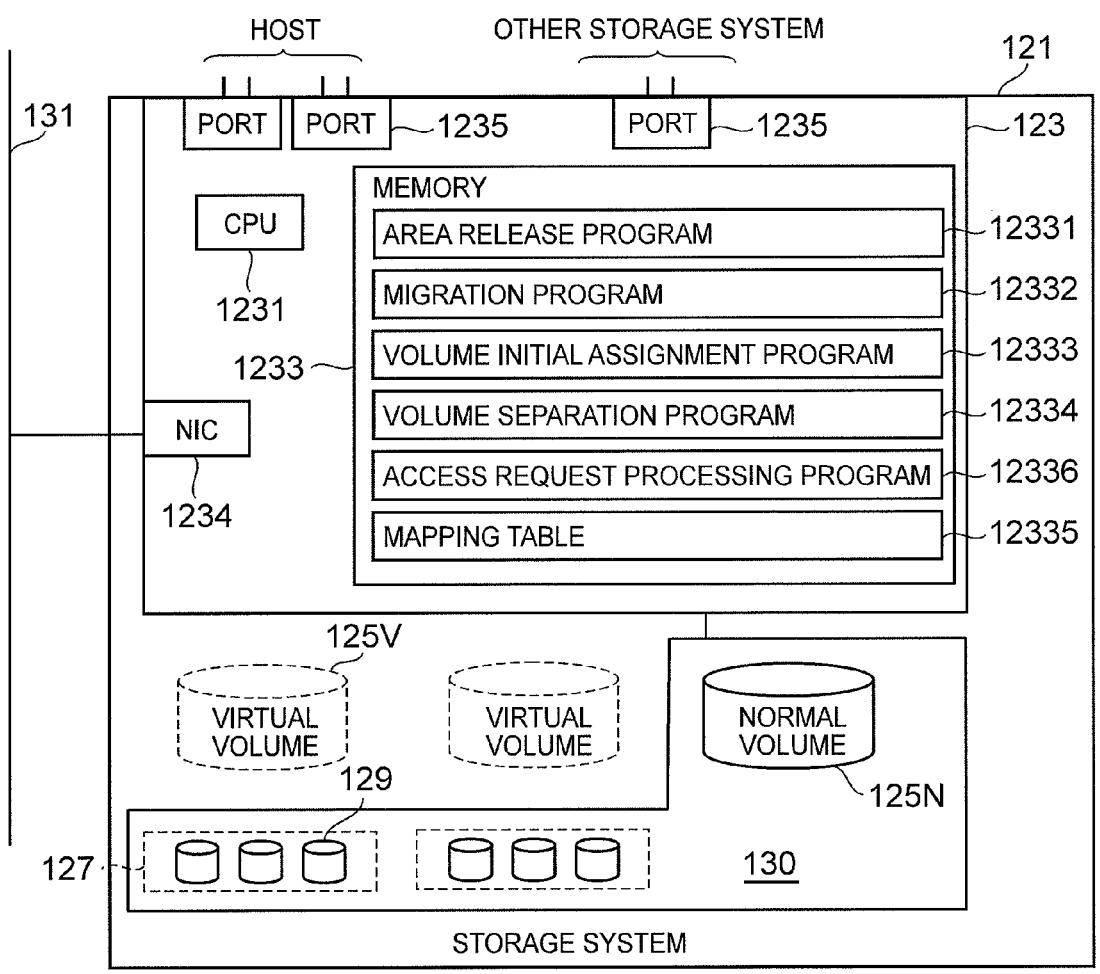
FIG. 2 shows a constitutional example of a storage system.

FIG. 2 shows a constitutional example of the storage system 121.

The storage controller 123 is a device (circuit, for example) which comprises a CPU 1231, a memory 1233, a plurality of ports 1235 and an NIC (Network Interface Card) 1234 and so forth.

The ports 1235 are communication interfaces for communicating via a predetermined protocol (FC (Fibre Channel), for example) with the host computer 101 or another storage system 121 via SAN 109.

NIC 1234 is a communication interface which is connected to the LAN 131.

The memory 1233 is used as a cache for temporarily storing data elements which are written to and read from a logical volume which has an entity. Further, the memory 1233 stores, as computer programs which are executed by the CPU 1231, an area release program 12331, a migration program 12332, a volume initial assignment program 12333, a volume separation program 12334, and an access request processing program 12336, for example. Furthermore, the memory 1233 stores the mapping table 12335 (see FIG. 24B) for each virtual volume 125V.

In cases where a target virtual volume is designated and called by the management server 111, the area release program 12331 releases all of the real pages which have been assigned to the designated virtual volume. More specifically, the area release program 12331 updates all of the fields for real page IDs in the mapping table 12335 which correspond with the designated virtual volume to a value which signifies that the real pages are unassigned ("Null", for example).

The migration program 12332 executes the migration of data between logical volumes. The migration source logical volume (migration source volume) and migration destination logical volume (migration destination volume) may be a virtual volume 125V or a normal volume 125N. In addition, the migration source volume and migration destination volume may exist in one storage system 121 or may exist in separate storage systems 121.

The volume initial assignment program 12333 assigns a logical volume (virtual volume 125V or normal volume 125N) which is designated by the volume assignment instruction to the host computer 101 designated by the volume assignment instruction in accordance with a volume assignment instruction from the management server 111.

The volume separation program 12334 separates the logical volume (virtual volume 125V or normal volume 125N) designated by a volume separation instruction from the management server 111 to the host computer 101 designated by the volume separation instruction in accordance with the volume separation instruction.

The access request processing program 12336 accesses the logical volume designated by the access request in accordance with the access request from the host computer 110. For example, in cases where the access request is a write request and the logical volume designated by the write request is the virtual volume 125V, the access request processing program 12336 temporarily stores the write-target data elements in the memory 1233, executes the assignment of a real page to the virtual page (updates the mapping table 12335), and writes the temporarily stored data elements to the assigned real page. Further, in cases where the access request is a read request and the logical volume designated by the read request is virtual volume 125V, for example, the access request processing program 12336 specifies the real page assigned to the virtual page specified by the read request by referencing the mapping table 12335. Further, the access request processing program 12336 reads data elements from the specified real page and temporarily stores the data elements in the memory 1233 before transmitting the temporarily stored data elements to the host computer 101.

The same processing as that of the access request processing program 12336 can also be executed by the migration program 12332. More specifically, for example, when the data elements are read from the migration source virtual volume, the migration program 12332 specifies the respective real pages assigned to the respective virtual pages by referencing the mapping table 12335 and reads the respective data elements from the respective real pages thus specified. Furthermore, for example, when the data elements are written to the migration destination virtual volume, the migration program 12332 assigns the respective real pages to the respective migration destination virtual pages (updates the mapping table 12335) and writes the respective data elements to each of the assigned real pages.

Figure 3:
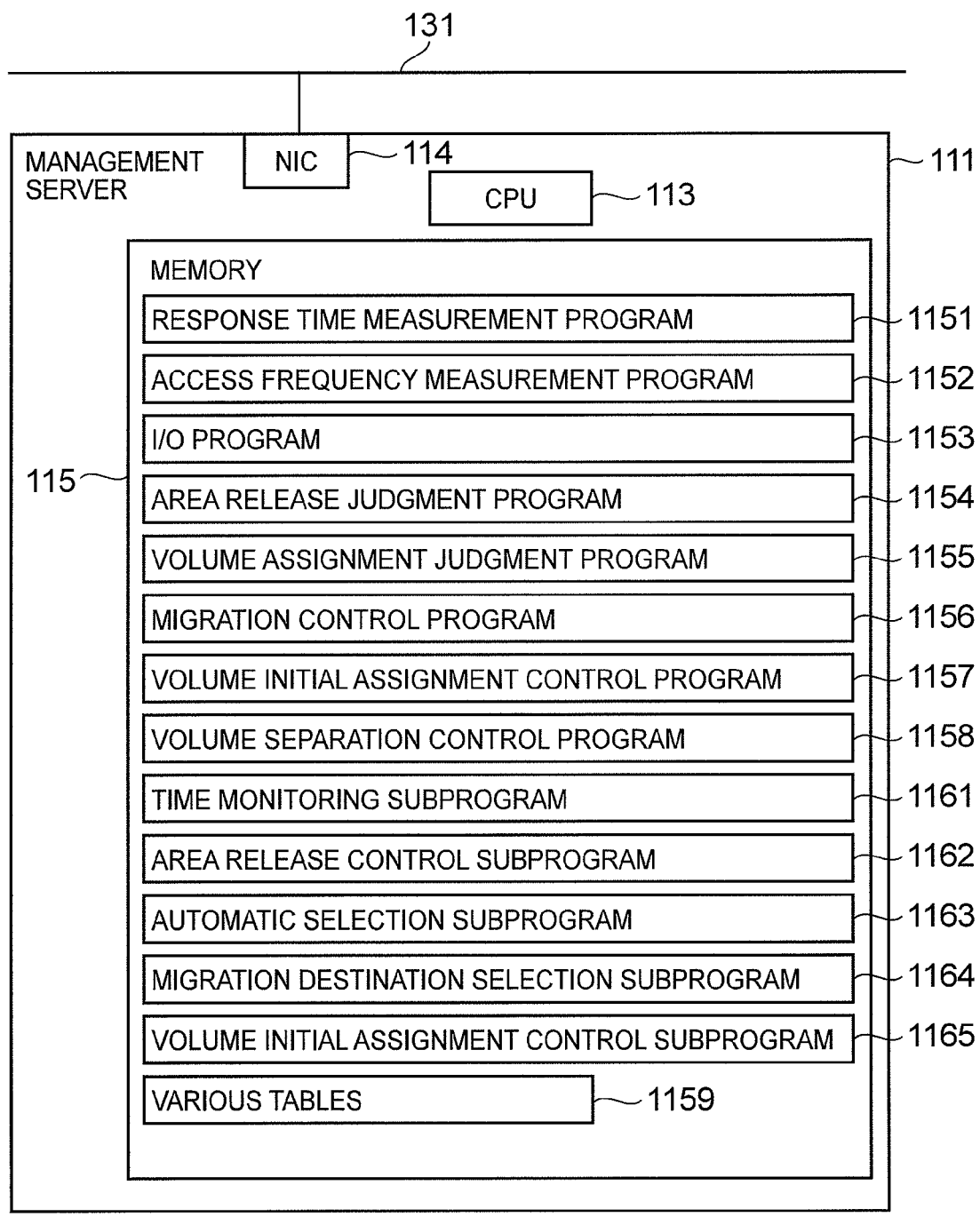
FIG. 3 shows a constitutional example of a management server.

FIG. 3 shows a constitutional example of the management server 111.

The memory 115 of the management server 111 stores, as computer programs which are executed by the CPU 113, a response time measurement program 1151 which measures the response time, an access frequency measurement program 1152 which measures the access frequency, an I/O program 1153 which stores various tables in an auxiliary storage device (an HDD, for example) (not shown) in the management server 111, an area release judgment program 1154 which selects the release/non-release of the real pages, a volume assignment judgment program 1155 which judges which logical volume to assign, a migration control program 1156 which controls migration, a volume initial assignment control program 1157 which initially controls the assignment to the host computer 101 of a particular logical volume, a volume separation control program 1158 which controls the separation of the logical volumes, a time monitoring subprogram 1161 which monitors the time since a certain point in time, an area release control subprogram 1162 which executes the release of a real page by calling the area release program 12331 in the storage system 121, an automatic selection subprogram 1163 which selects an assignable logical volume (virtual volume, for example) as an assignment target, a migration destination selection subprogram 1164 which selects an assignable migration destination volume, and a volume initial assignment control subprogram 1165 which initially selects an assignable logical volume. The operation of the respective computer programs 1151 to 1158 and 1161 to 1165 will be described in detail hereinafter with reference to FIGS. 12 to 23.

Furthermore, the memory 115 stores various tables 1159 and, more specifically, as shown in FIGS. 4 to 11, the user set value table 11591 for managing the values set by the user, the volume management table 11592 for managing the respective virtual volume and respective normal volume, the real volume management table 11593 for managing which real volume is assigned to which virtual volume, a measurement time table 11594 for managing the start time and end time of various measurements, an access frequency accumulation table 11595 for accumulating the access frequency history, an access frequency table 11596 for managing the access frequency average value, a response time accumulation table 11597 for accumulating the response time history, and the response time table 11598 for managing the response time average value. Tables 11591 and 11598 will be described hereinbelow. In the following description, numbers will sometimes be used as identifiers but the identifiers used are not limited to numbers. Rather, various codes such as reference symbols and alphabetical characters can be employed.

FIG. 4 shows a constitutional example of the user set value table 11591.

The user set value table 11591 records, for each virtual volume, information which indicates the storage system number (the number of the storage system comprising the virtual volume), the volume number (virtual volume number), the user setting status, and the release time.

The user setting status is the status relating to the control of the release of all of the real pages assigned to the virtual volume and is set by the user. The types of values which are set as the status include four types which are "immediate release", "release after a fixed time", "re-used", and "automatic judgment", for example. The user setting status "immediate release" is a status which signifies the fact that all the real pages assigned to the virtual volume are released when the virtual volume is switched from a used target to an unused target. The user setting status "release after a fixed time" is a status which signifies the fact that all of the real pages assigned to the virtual volume are released after a fixed time after the virtual volume has been switched from a used target to an unused target. Here, the fixed time may be a fixed value or may be a time which is set by the user as the release time (after 10 minutes, for example). The user setting status "re-used" is a status which signifies the fact that all of the real pages assigned to the virtual volume are not released even when the virtual volume has been switched from a used target to an unused target (the state where the real pages are assigned is maintained). Therefore, in a case where a virtual page to which a real page has been assigned of the virtual volume which has been switched from an unused target to a used target is the write destination, for example, there is no need to especially assign a real page. That is, after the real pages which have been assigned prior to switching to an unused target have been switched from the unused target to a used target, these real pages are re-used. The user setting status "automatic judgment" is a status which signifies the fact that the release/non-release of the assigned real pages is not designated by the user but instead subject to the judgment of the area release judgment program 1154.

FIG. 5 shows a constitutional example of the volume management table 11592.

The volume management table 11592 records, for each virtual volume and normal volume, the storage system number (the number of the storage system comprising the logical volume), the volume number (logical volume number), the type (logical volume type), the capacity (the storage capacity of the logical volume), the request time (the time at which the area release judgment program 1154 is called), and the volume status. The types include, for example, "virtual", which signifies a virtual volume, and "normal", which signifies a normal volume. In addition, the volume status includes, for example, "re-used", which signifies the fact that all of the assigned real pages are assigned as is, "assigned", which signifies the fact that the volume is assignable, "released", which means that all of the assigned real pages have been released, "migration", which signifies the fact that the volume has been assigned as the migration destination, "initially assigned", which signifies the fact that the volume is initially assigned to the host computer, "candidate x", which means that the volume is a candidate of a certain type (x is an integer such as 1, 2, or 3, for example). If differences in the user setting status are stated, user setting statuses include, for example, "re-used", "immediate release", and "release after a fixed time", whereas volume statuses include "re-used" and "released". That is, that is not to say that, for the volume statuses, there are not a plurality of types of statuses relating to release such as "immediate release" and "release after a fixed time" (naturally, a plurality of types are possible).

FIG. 6 shows a constitutional example of the real volume management table 11593.

The real volume management table 11593 records, for each virtual volume, the storage system number (the number of the storage system comprising the virtual volume), and the volume number (the number of the virtual volume), and the real volume number (the number of the real volume comprising the real page assigned to the virtual volume). In cases where the real volume comprising a real page which is assigned to the virtual volume does not comprise a real page which is assigned to the virtual volume, a record recording the number of the real volume is added to the virtual volume in the table 11593.

FIG. 7 shows a constitutional example of a measurement time table 11594.

The measurement time table 11594 records, for each type of measurement target, the type (the type of measurement target), the start (the measurement start time), and the end (measurement end time). The types include, for example, the "response time" and "access frequency". The response time is the time interval from the time the command designating a certain volume is issued until a response is returned. The access frequency indicates that how many access requests have been issued by the host computer per unit of time.

FIG. 8 shows a constitutional example of the access frequency accumulation table 11595.

The access frequency accumulation table 11595 is a table that is prepared for each host computer. The access frequency accumulation table 11595 records the host identifier (the identifier of the host computer which corresponds with table 11595), and the access frequency (the history of the access frequency measured for the host computer), for example.

FIG. 9 shows a constitutional example of the access frequency table 11596.

The access frequency table 11596 records, for each host computer 101, a host identifier (the identifier of the host computer 101) and the access frequency average value.

FIG. 10 shows a constitutional example of the response time accumulation table 11597.

The response time accumulation table 11597 is a table which is prepared for each virtual volume 125V and normal volume 125N. The response time accumulation table 11597 records, for example, the storage system number (the number of the storage system which comprises the virtual volume 125V or normal volume 125N corresponding with the table 11597), the volume number (the number of the virtual volume 125V or of normal volume 125N), the type (the type of the virtual volume 125V or the type of the normal volume 125N), and the response time (the history of the response times measured for the virtual volume 125V or normal volume 125N).

FIG. 11 shows a constitutional example of the response time table 11598.

The response time table 11598 records, for each virtual volume 125V or normal volume 125N, the storage system number, volume number, type, and response time average value.

Figure 12:
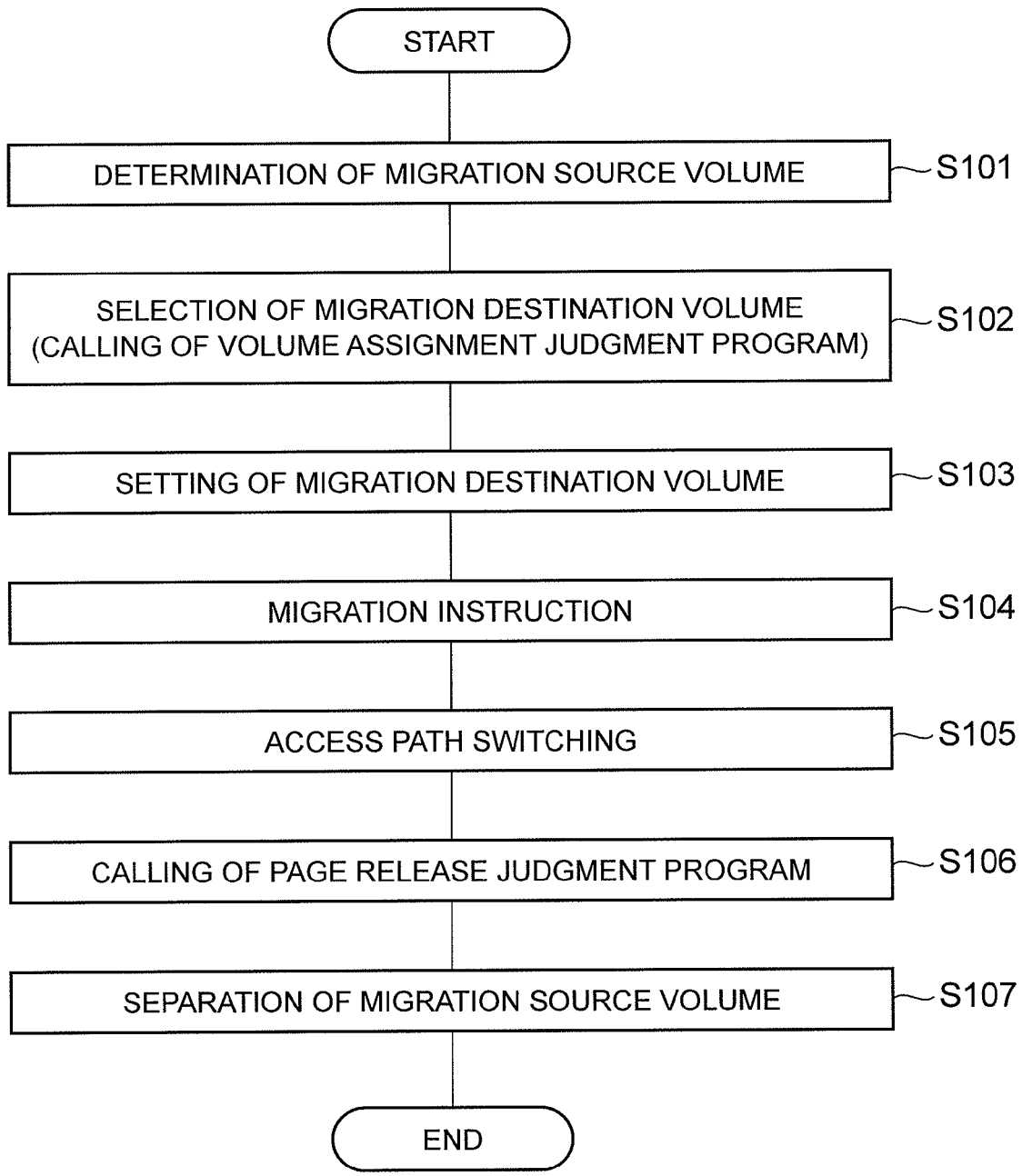
FIG. 12 is a flowchart of the operation of a migration control program.

The flow of the processing which is carried out in this embodiment will be described hereinbelow. In this description, the following two cases will be described as representative examples:
(Case 1) Migration; and
(Case 2) Initial assignment of the logical volume. Furthermore, in the description of the flow of processing in each case, the operation of the respective computer programs 1151 to 1158 and 1161 to 1165 will also be described.
(Case 1) Migration FIG. 12 is a flowchart of the operation of the migration control program 1156. In other words, FIG. 12 provides an overview of the flow of the migration processing.

In step 101, the migration control program 1156 determines the migration source volume from among a plurality of virtual volumes 125V and/or normal volumes 125N which are in one or a plurality of storage systems 121. The migration source volume may be determined both manually and automatically.

In step 102, the migration control program 1156 calls the volume assignment judgment program 1155. As a result, the migration destination volume is selected.

In step 103, the migration control program 1156 sets the migration destination volume. More specifically, the migration control program 1156 sets a path from the migration source volume to the migration destination volume.

In step 104, the migration control program 1156 transmits a migration instruction designating the number of the migration source volume and the number of the migration destination volume to the storage system 121 which comprises the migration source volume (or migration destination volume). As a result, all of the data elements stored in the migration source volume are copied from the migration source volume to the migration destination volume by the migration program 12332 in the storage system 121 which is the transmission destination of the migration instruction. The migration program 12332 reports the completion to the migration control program 1156 in the management server 111 once the copying of all of the data elements is complete. As a result, the migration control program 1156 is able to identify the fact that the migration source volume has been switched from a used target to an unused target.

In step 105, the migration control program 1156 switches the access destination of the access path from the host computer 101 from the migration source volume to the migration destination volume. As a result, the host computer 101 then accesses the migration destination volume instead of the migration source volume.

In step 106, the migration control program 1156 calls the area release judgment program 1154. Thereupon, the migration control program 1156 reports the number of the virtual volume 125V which is the migration source volume to the called area release judgment program 1154. As a result, in cases where the migration source volume is virtual volume 125V, it is determined whether or not to instantly release all of the real pages assigned to the virtual volume 125V or release same after a fixed time or whether to maintain a state where the real pages are assigned without being released even after a fixed time has elapsed.

In step 107, the migration control program 1156 separates the migration source volume from the host computer 101. More specifically, the migration control program 1156 transmits an instruction to perform a volume switch to the storage system 121 which comprises a migration source volume (an instruction comprising the identifier of the host computer and the number of the migration source volume, for example). As a result, separation of the migration source volume from the host computer 101 is carried out by the volume separation program 12334 in the storage system 121. Thereafter, the migration source volume can be assigned to other applications. For example, the migration source volume can be newly assigned to another host computer 101 or can be selected as the migration destination volume.

Figure 20:
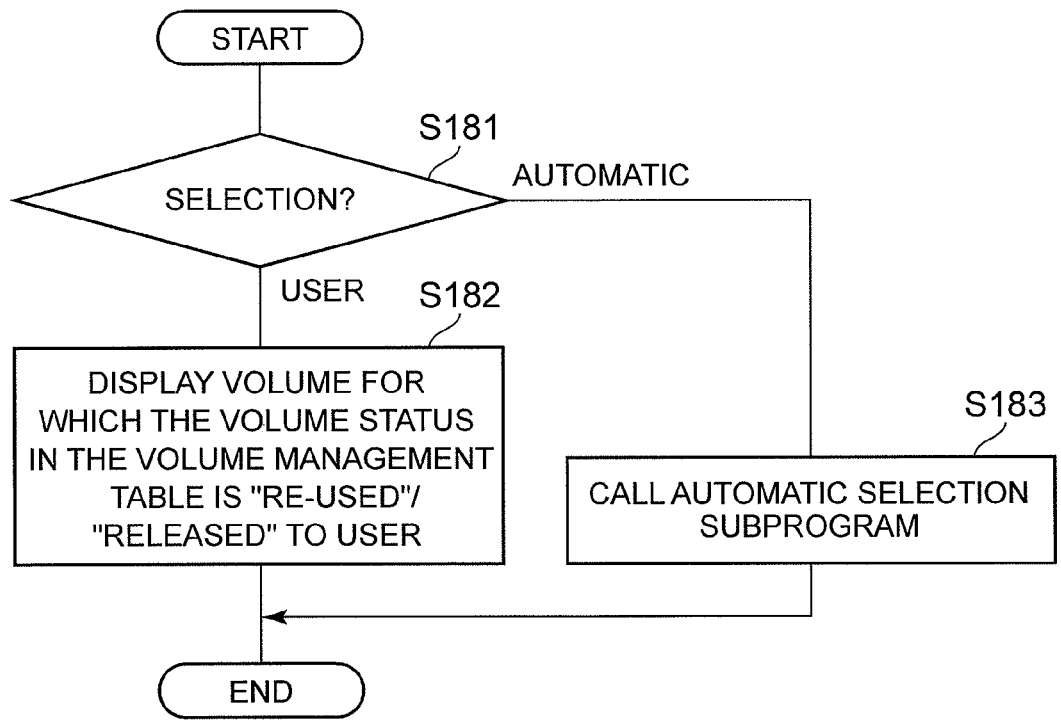
FIG. 20 is a flowchart of the operation of a volume assignment judgment program.

FIG. 20 is a flowchart of the operation of the volume assignment judgment program 1155.

In step 161, the volume assignment judgment program 1155 judges whether a volume is to be selected by the user or selected automatically. More specifically, for example, information representing whether a user selection or an automatic selection is made can be stored in a specified storage area in the management server 111 and a user selection or automatic selection can be judged by referencing this information. Settings can be made using a variety of units for each storage system 121, each port 1235, or each volume, by means of user selection or automatic selection.

In cases where user selection is judged in step 161, step 162 is executed. However, in cases where automatic selection is judged in step 161, step 163 is executed.

In step 162, the volume assignment judgment program 1155 displays a virtual volume list. The user is able to select any of a plurality of virtual volumes which correspond with a plurality of volume numbers which are recorded in the list. The selectable virtual volumes are each virtual volumes for which the volume status in the volume management table 11592 is "re-used" or "released".

In step 163, the volume assignment judgment program 1155 calls the automatic selection subprogram 1163. Thereupon, the volume assignment judgment program 1155 issues a report to the automatic selection subprogram 1163 with regard to the call source program of the volume assignment judgment program 1155.

Figure 21:
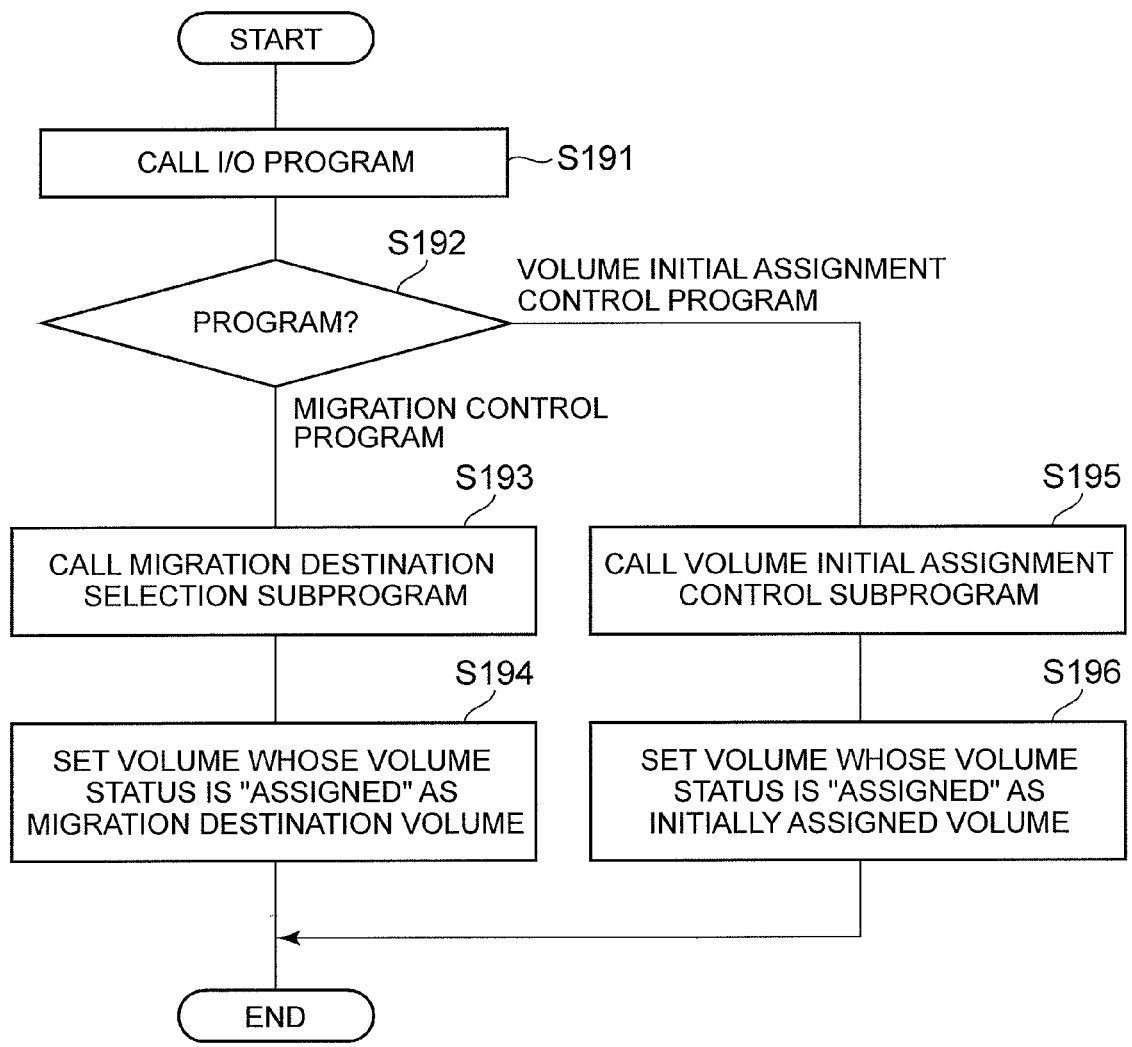
FIG. 21 is a flowchart of the operation of an automatic selection subprogram.

FIG. 21 is a flowchart of the operation of the automatic selection subprogram 1163.

In step 191, the automatic selection subprogram 1163 calls the I/O program 1153.

In step 192, the automatic selection subprogram 1163 judges whether the call source program of the volume assignment judgment program 1155 is the migration control program 1156 or the volume initial assignment control program 1157. If the call source program of the volume assignment judgment program 1155 is the migration control program 1156, step 193 is executed and, if the call source program of the volume assignment judgment program 1155 is the volume initial assignment control program 1157, step 195 is executed. This case relates to migration and, therefore, here, steps 193 and 194 are described and steps 195 and 196 are described for the subsequent '(Case 2) Initial assignment of logical volume'.

In step 193, the automatic selection subprogram 1163 calls the migration destination selection subprogram 1164.

In step 194, the automatic selection subprogram 1163 sets a logical volume whose volume status has been set as "assigned" as the migration destination volume by means of the migration destination selection subprogram 1164. More specifically, the automatic selection subprogram 1163 updates the volume status of the logical volume from "assigned" to "migration destination". In step 103 in FIG. 12, a path is extended from the migration source volume to the logical volume.

Thereafter, the updated volume management table 11592 is stored in the auxiliary storage device (not shown) in the management server 111 by the I/O program 1153 which is called in step 191.

Figure 22:
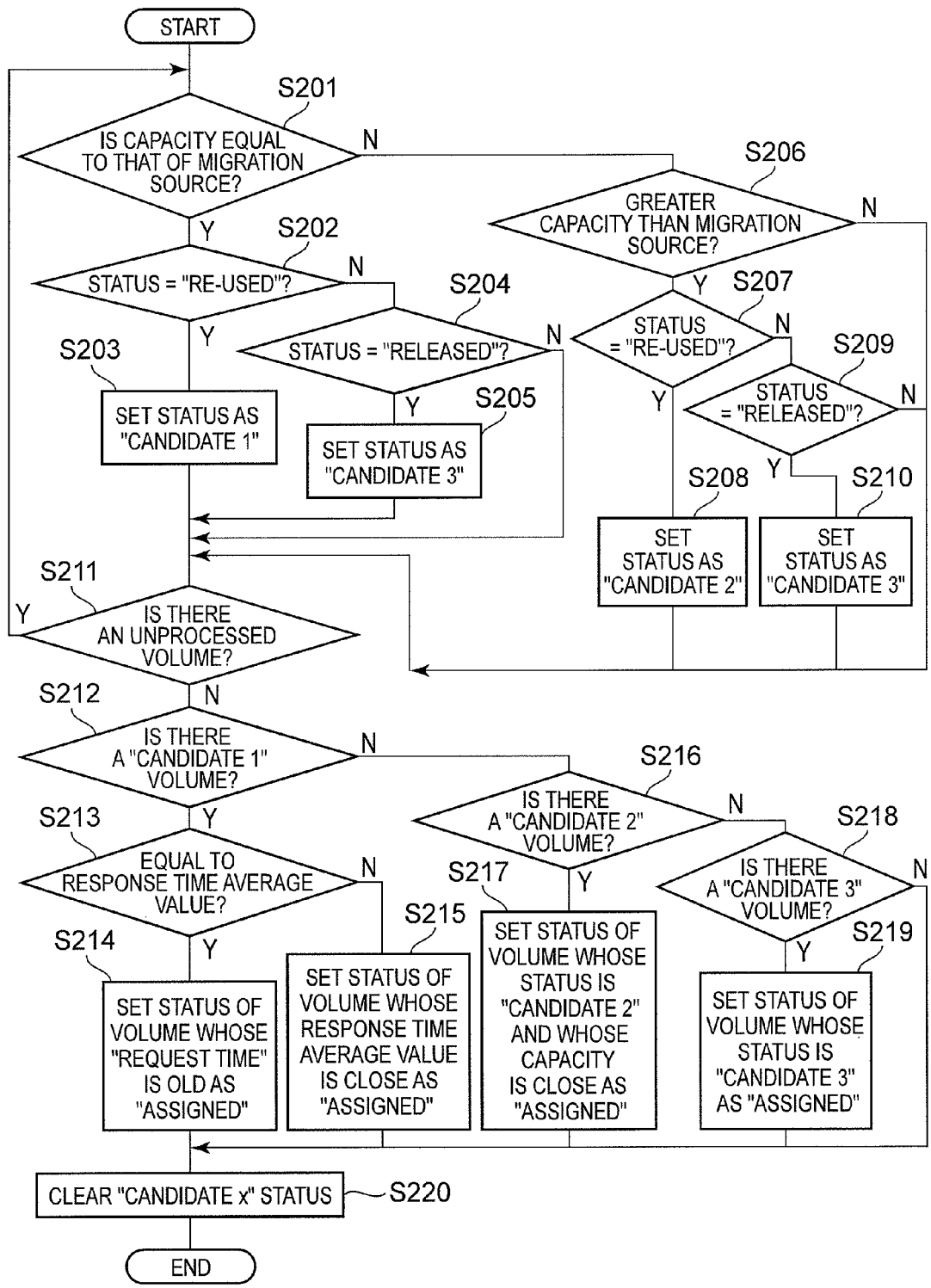
FIG. 22 is a flowchart of the operation of a migration destination selection subprogram.

FIG. 22 is a flowchart of the operation of the migration destination selection subprogram 1164.

The migration destination selection subprogram 1164 performs the processing of steps 201 to 211 for the respective logical volumes recorded in the volume management table 11592. The logical volume which corresponds with one record in the volume management table 11592 will be called the 'target volume' in the description of FIG. 22 hereinbelow.

In step 201, the migration destination selection subprogram 1164 judges whether the storage capacity of the migration source volume and the storage capacity of the target volume are equal. When it is judged that the storage capacity of the migration source volume and the storage capacity of the target volume are equal, step 202 is executed and, given an unequal judgment, step 206 is executed.

In step 202, the migration destination selection subprogram 1164 judges whether the volume status of the target volume is "re-used". If it is judged that the volume status of the target volume is "re-used", step 203 is executed and, given the judgment that the volume status is not "re-used", step 204 is executed.

In step 203, the migration destination selection subprogram 1164 sets the volume status of the target volume as "candidate 1".

In step 204, the migration destination selection subprogram 1164 judges whether or not the volume status of the target volume is "released". If it is judged that the volume status is "released", step 205 is executed and, given a judgment that the volume status is not "released", step 211 is executed.

In step 205, the migration destination selection subprogram 1164 sets the volume status of the target volume as "candidate 3".

In step 206, the migration destination selection subprogram 1164 judges whether the storage capacity of the target volume is greater than the storage capacity of the migration source volume. If it is judged that the storage capacity of the target volume is greater than the storage capacity of the migration source volume, step 207 is executed and, if it is judged that this storage capacity is not greater, step 211 is executed.

In step 207, the migration destination selection subprogram 1164 judges whether the volume status of the target volume is "re-used". If it is judged that the volume status is "re-used", step 208 is executed and, if it is judged that the volume status is not "re-used", step 209 is executed.

In step 208, the migration destination selection subprogram 1164 sets the volume status of the target volume as "candidate 2".

In step 209, the migration destination selection subprogram 1164 judges whether the volume status of the target volume is "released". If it is judged that the volume status is "released", step 210 is executed and, if it is judged that the volume status is not "released, step 211 is executed.

In step 210, the migration destination selection subprogram 1164 sets the volume status of the target volume as "candidate 3".

In step 211, the migration destination selection subprogram 1164 judges whether there is an unprocessed volume, that is, an unreferenced record in the volume management table 11592. If the judgment is that there is an unprocessed volume, step 201 is executed for the logical volume which corresponds with a certain single unreferenced record and, if it is judged that there is no unprocessed volume, step 212 is executed.

According to the above processing, the volume statuses "candidate 1", "candidate 2", and "candidate 3" each signify the following:

Candidate 1: the storage capacity of the target volume is equal to the storage capacity of the migration source volume and the volume status of the target volume is "re-used".

Candidate 2: the storage capacity of the target volume is greater than the storage capacity of the migration source volume and the volume status of the target volume is "re-used".

Candidate 3: the volume status of the target volume is "released" irrespective of whether the storage capacity of the target volume is equal to or greater than the storage capacity of the migration source volume.

In step 212, the migration destination selection subprogram 1164 judges whether there is a logical volume of volume status "candidate 1". If it is judged that there is a logical volume of volume status "candidate 1", step 213 is executed and, if it is judged that there is no such logical volume, step 216 is executed.

In step 213, the migration destination selection subprogram 1164 judges whether there is a logical volume of volume status "candidate 1" for which the response time average value is equal to that of the migration source volume. If it is judged that there is such a logical volume, step 214 is executed and, if it is judged that there is no such logical volume, step 215 is executed.

In step 214, the migration destination selection subprogram 1164 changes the volume status from "candidate 1" to "assigned" for the logical volume whose volume status "candidate 1" for which the response time average value is equal to that of the migration source volume and which has the oldest "request time".

In step 215, the migration destination selection subprogram 1164 changes the volume status from "candidate 1" to "assigned" for the logical volume whose volume status is "candidate 1" and whose response time average value is closest to the response time average value of the migration source volume.

In step 216, the migration destination selection subprogram 1164 judges whether there is a logical volume whose volume status is "candidate 2". If it is judged that there is such a logical volume, step 217 is executed and, if it is judged that there is no such logical volume, step 218 is executed.

In step 217, the migration destination selection subprogram 1164 changes the volume status from "candidate 2" to "assigned" for the logical volume whose volume status is "candidate 2" and whose storage capacity is closest to the migration source volume.

In step 218, the migration destination selection subprogram 1164 judges whether there is a logical volume whose volume status is "candidate 3". If it is judged that there is such a logical volume, step 219 is executed and, if it is judged that there is no such logical volume, step 220 is executed.

In step 219, the migration destination selection subprogram 1164 changes the volume status from "candidate 3" to "assigned" for one logical volume whose volume status is "candidate 3" and whose storage capacity is closest to the migration source volume.

In step 220, the migration destination selection subprogram 1164 deletes the volume status "candidate x" (here, x is any integer among 1, 2, and 3) from the volume management table 11592.

Among the steps 214, 215, 217, or 219 in FIG. 22, the volume status of the logical volume for which the volume status "assigned" has been set is changed from "assigned" to migration destination" in step 194 in FIG. 21.

Figure 17:
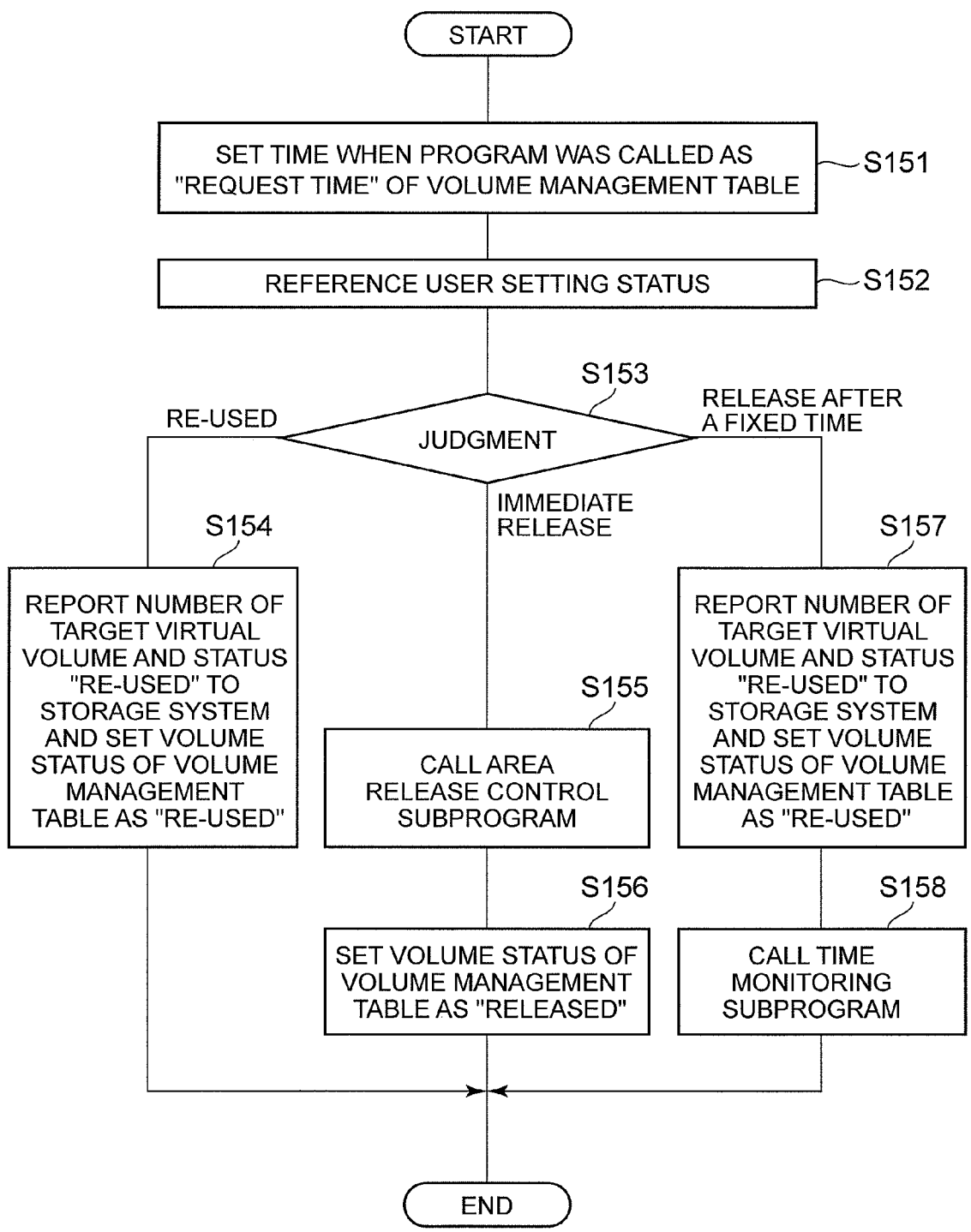
FIG. 17 is a flowchart of the operation of an area release judgment program.

FIG. 17 is a flowchart of the operation of the area release judgment program 1154.

The area release judgment program 1154 is called in step 106 of FIG. 12 or step 121 in FIG. 14 (described subsequently), for example. Here, a report of the number of the virtual volume 125V constituting the target is received.

In step 151, the area release judgment program 1154 sets the time thus called in the "request time" field (the field in the volume management table 11592) which corresponds with the volume number thus reported.

In step 152, the area release judgment program 1154 references the user setting status which corresponds with the target virtual volume.

In step 153, the area release judgment program 1154 judges whether the user setting status of the target virtual volume is any of re-used, immediate release, and release after a fixed time. Furthermore, for example, in cases where the user setting status is "re-used" or where re-used is selected in the automatic selection processing which is executed in cases where the user setting status is "automatic selection", step 154 is executed. In addition, for example, in cases where the user setting status is "immediate release" or where immediate release is selected in the automatic selection processing which is executed in cases where the user setting status is "automatic selection", step 155 is executed. Further, in cases where the user setting status is "release after a fixed time" or where release after a fixed time is selected in the automatic selection processing which is executed in a case where the user setting status is "automatic selection", for example, step 157 is executed.

In step 154, the area release judgment program 1154 specifies the storage system 121 which has a target virtual volume by referencing the volume management table 11592. Furthermore, the area release judgment program 1154 reports the number and status "re-used" of the target virtual volume to the specified storage system 121. In addition, the area release judgment program 1154 updates the volume status of the target virtual volume to "re-used".

Figures 24A, 24B, 24C:
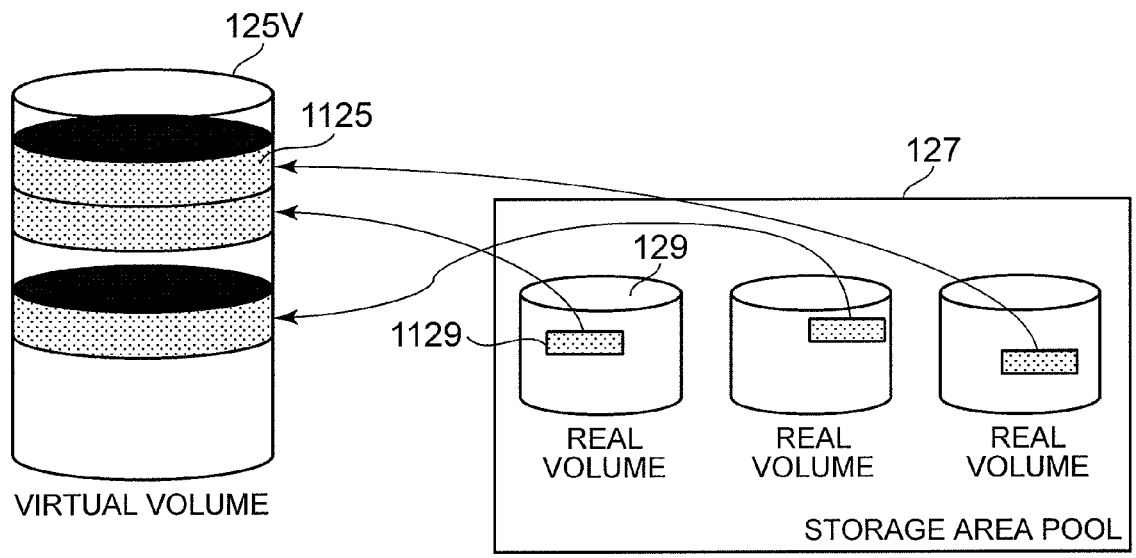
FIG. 24A is an explanatory diagram illustrating the dynamic assignment of real pages.
FIG. 24B shows an example of a mapping table which corresponds with a virtual volume in a state where the real pages which have been assigned to the virtual volume have not been released.
FIG. 24C shows an example of a mapping table which corresponds with a virtual volume in a state where all of the real pages assigned to the virtual volume are released.
Figure 25A:
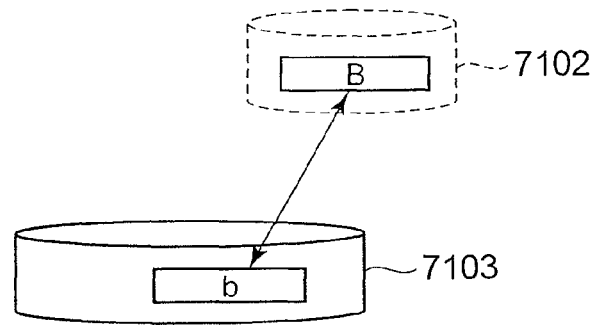
FIG. 25A shows a state where a real storage area in a real volume is assigned to a virtual volume.
Figure 25B:
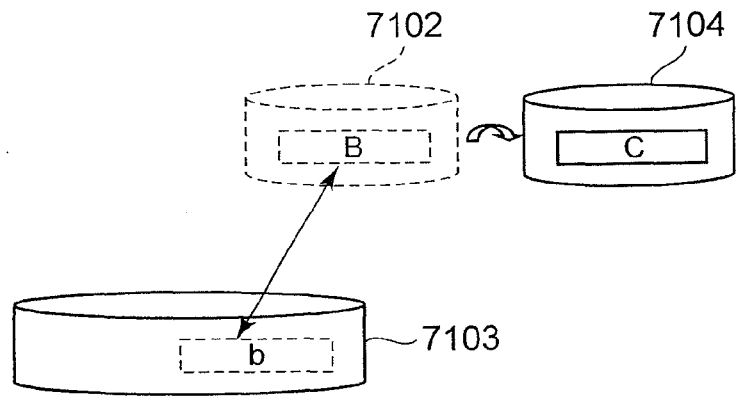
FIG. 25B shows migration of data elements from one virtual volume to a normal volume among two virtual volumes.
Figure 25C:
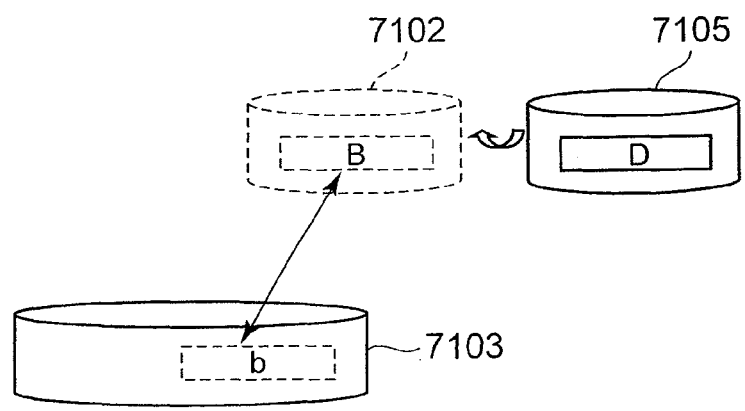
FIG. 25C illustrates the fact that data elements migrate from another normal volume to the first virtual volume following migration.
Figure 26A:
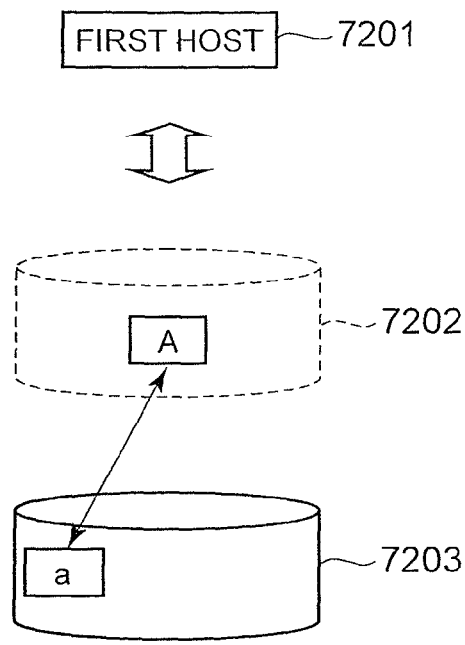
FIG. 26A shows the fact that a virtual volume has been assigned to the first host.
Figure 26B:
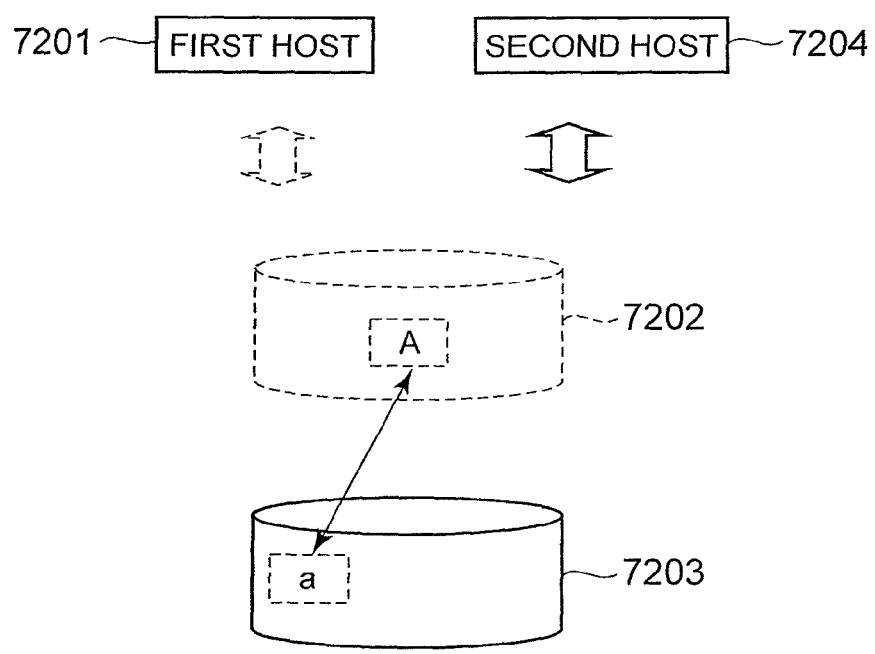
FIG. 26B shows the fact that the virtual volume has been assigned to the second host after the assignment of the virtual volume to the first host has been cancelled.

In cases where the specified storage system 121 receives the number and status "re-used" of the target virtual volume, all of the real pages assigned to the target virtual volume in the storage system 121 remain assigned instead of being released. This is because the area release program 12331 has not been called. That is, this is because a value signifying non-assignment has not been set for all of the fields which correspond with the real page in the mapping table 12335 which corresponds with the target virtual volume. As a result, for example, in cases where the mapping table 12335 is the table 12335 illustrated in FIG. 24B, an update such as that illustrated in FIG. 24C is not carried out and the table 12335 which is illustrated in FIG. 24B is maintained.

In step 155, the area release judgment program 1154 calls the area release control subprogram 1162. Thereupon, the area release judgment program 1154 reports the number of the target virtual volume to the area release control subprogram 1162.

In step 156, the area release judgment program 1154 updates the volume status of the target virtual volume to "released".

In step 157, the area release judgment program 1154 executes the same processing as that of step 154.

In step 158, the area release judgment program 1154 calls the time monitoring subprogram 1161.

Further, "re-used", "immediate release", or "release after a fixed time" is determined for a target virtual volume by means of any of the following methods (A) to (D) or by means of a method consisting of a combination of two or more of (A) to (D), for example, in automatic selection processing which is executed in cases where the user setting status is "automatic selection".

(A) "re-used", "immediate release", or "release after a fixed time" is selected on the basis of the access frequency with respect to the target virtual volume (prior to the end of migration, for example) up until prior to switching to the unused target. For example, if the access frequency is large, "re-used" is selected and, if the access frequency is medium, "release after a fixed time" is selected and, if the access frequency is small, "immediate release" is selected. The access frequency of the respective virtual volumes up until prior to switching to an unused target is acquired by the access frequency measurement program 1152. The 'access frequency' as it is intended here may be one representative access frequency among a plurality of measured access frequencies for one virtual volume or may be a value which is measured on the basis of two or more access frequencies among the plurality of access frequencies (the average value, for example). This is not limited to case (A) but, rather, is the same for FIG. 23 (described subsequently), for example.

(B) "Re-used", "immediate release", or "release after a fixed time" is selected on the basis of the performance of the real volume assigned to the target virtual volume. For example, in cases where the performance of the assigned real volume (in cases where a plurality of real volumes have been assigned, a value which is calculated based on how many real pages have been assigned from a particular real volume and on the performance of the real volumes themselves) is high, "re-used" is selected and, if the performance of the assigned real volume is medium, "release after a fixed time" is selected. If the performance of the assigned real volume is low, "immediate release" is selected. The performance of the real volume is determined from the type of the physical storage device based on the real volume, for example (FC (Fibre Channel), ATA (Advanced Technology Attachment), for example).

(C) "Re-used", "immediate release", or "release after a fixed time" is selected on the basis of the performance of the target virtual volume. For example, if the performance of the target virtual volume is high, "re-used" is selected; if the performance of the target virtual volume is medium, "release after a fixed time" is selected; and if the performance of the target virtual volume is low, "immediate release" is selected. The performance of the target virtual volume is the response time, for example. The response time as it is intended here may be one representative access frequency among a plurality of measured response times for one virtual volume or may be a value which is measured on the basis of two or more response times among the plurality of response times (average value, for example). This is not limited to case (C) but, rather, is the same for at least one of steps 214 and 215 in FIG. 22, for example.

(D) "Re-used", "immediate release", or "release after a fixed time" is selected on the basis of the number of unassigned real pages (the ratio of the number of unassigned real pages to the number of real pages, for example). For example, if there is a large number of unassigned real pages, "re-used" is selected; if the number of unassigned real pages is medium, "release after a fixed time" is selected; and, if the number of unassigned real pages is small, "immediate release" is selected.

Figure 18:
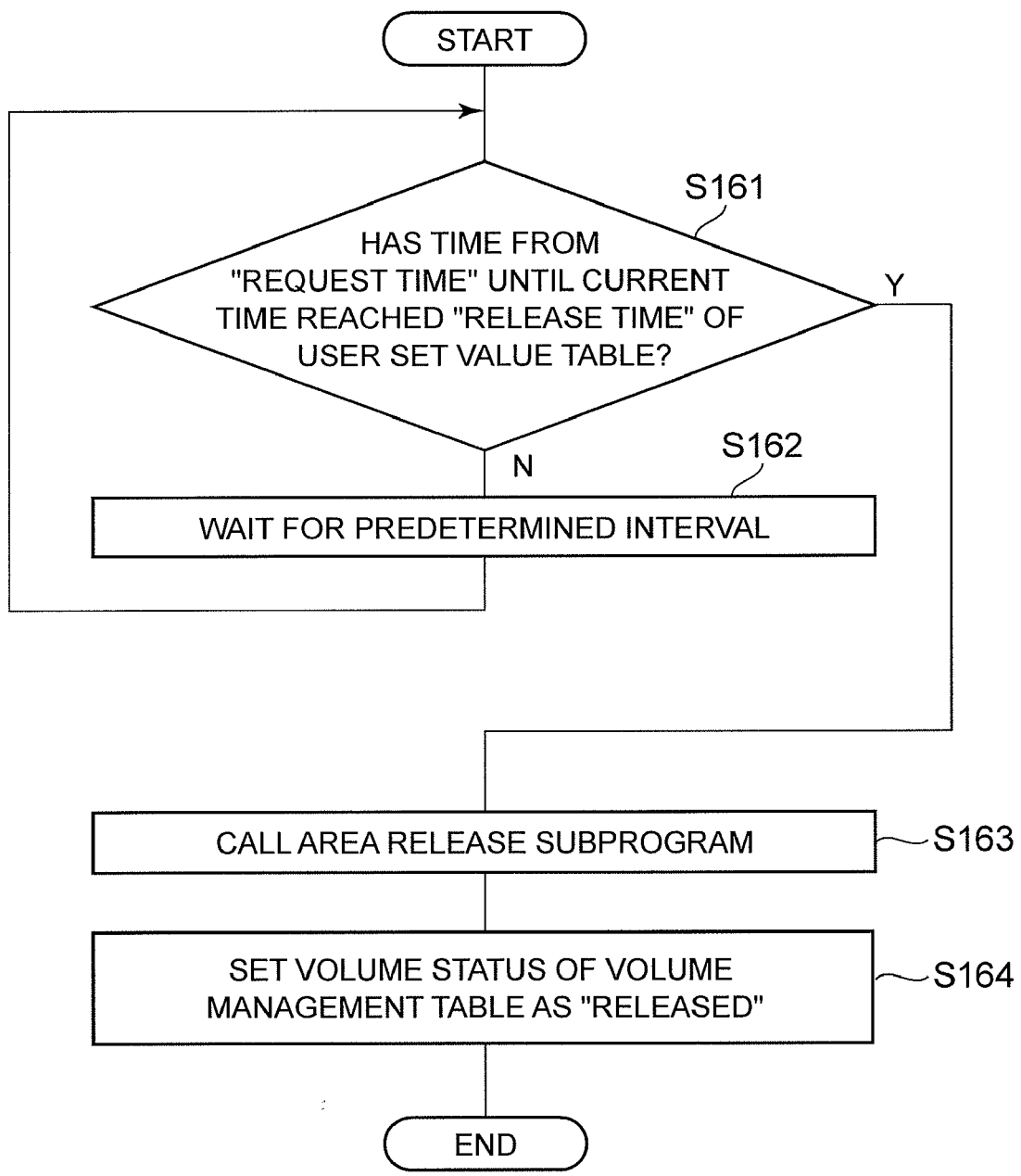
FIG. 18 is a flowchart of the operation of a time monitoring subprogram.

FIG. 18 is a flowchart of the operation of the time monitoring subprogram 1161.

In step 161, the time monitoring subprogram 1161 judges whether the time up until the current time from the time represented by the "request time" in the volume management table 11592 has reached the time which is represented by the "release time" of the user set value table 11591. If the judgment is that this time has not been reached, step 162 is executed and, if the judgment is that the time has been reached (or exceeded), step 163 is executed.

In step 162, the time monitoring subprogram 1161 executes step 161 once again after waiting for a predetermined interval.

In step 163, the time monitoring subprogram 1161 calls the area release control subprogram 1162. Thereupon, the time monitoring subprogram 1161 reports the number of the virtual volume for which the time represented by the "release time" has elapsed to the area release control subprogram 1162.

In step 164, the time monitoring subprogram 1161 sets the volume status of the virtual volume for which the time represented by the "release time" has elapsed to "released".

Figure 19:
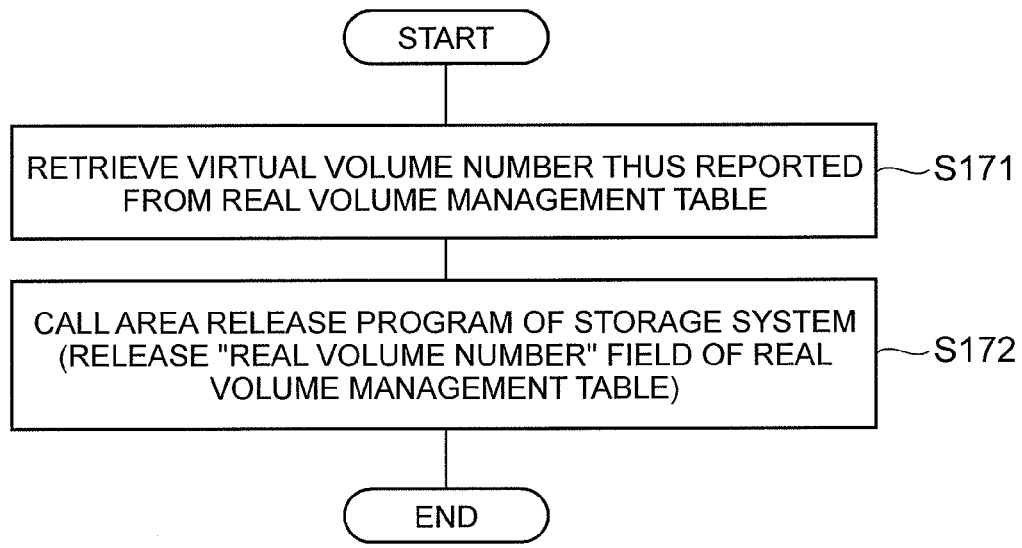
FIG. 19 is a flowchart of the operation of an area release control subprogram.

FIG. 19 is a flowchart of the operation of the area release control subprogram 1162.

In step 171, the area release control subprogram 1162 retrieves the reported virtual volume number from the real volume management table 11593.

In step 172, the area release control subprogram 1162 releases the real volume number field which corresponds with the reported virtual volume number (zeros the number of the real volume number, for example). Further, the area release control subprogram 1162 calls the area release program 12331 in the storage system 121 which comprises the virtual volume which corresponds with the reported virtual volume number. Thereupon, the area release control subprogram 1162 reports the reported virtual volume number to the area release program 12331. As a result, the area release program 12331 of the storage system 121 deletes all of the real page IDs recorded in the mapping table 12335 which correspond with the reported virtual volume number.

The processing of (Case 1) Migration was described hereinabove. According to this description, the migration destination volume is automatically selected on the basis of the following items (1) to (4):

(1) The storage capacity of the migration source volume;
(2) The performance of the migration source volume;
(3) The request time; and
(4) The volume status.

In addition, according to the above description, once migration is complete, a selection is made with respect to whether all the real pages assigned to the migration source virtual volume are to be released immediately, whether the real pages are to be released after a fixed time, or whether these real pages are to remain assigned rather than being released.

(Case 2) Initial Assignment of Logical Volume

Figure 13:
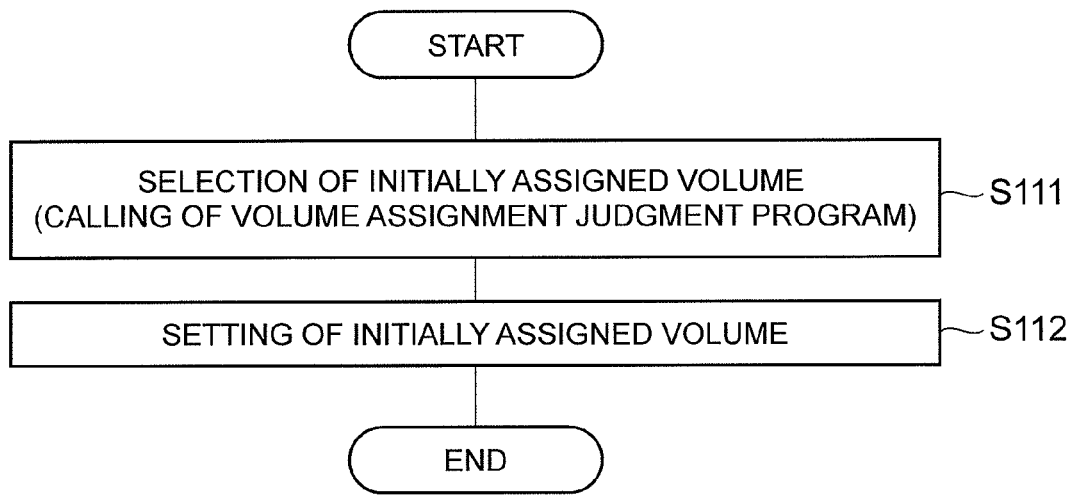
FIG. 13 is a flowchart of the operation of a volume initial assignment control program.

FIG. 13 is a flowchart of the operation of the volume initial assignment control program 1157. In other words, FIG. 13 provides an overview of the flow of the initial assignment of a logical volume.

In step 111, the volume initial assignment control program 1157 calls the volume assignment judgment program 1155. As a result, the logical volume which was initially assigned to the assignment destination host computer 101 (the initially assigned volume) is selected.

In step 112, the volume initial assignment control program 1157 sets the initially assigned volume. More specifically, the volume initial assignment control program 1157 sets the path linking the target host computer 101 and the initially assigned volume.

In cases where the volume assignment judgment program 1155 is called in step 111, the flow in FIG. 20 is executed. In cases where step 183 in FIG. 20 is executed, the flow of FIG. 21 is executed. In FIG. 21, steps 195 and 196 are executed following step 192.

That is, in step 195, the automatic selection subprogram 1163 calls the volume initial assignment control subprogram 1165.

In step 196, the automatic selection subprogram 1163 sets a logical volume whose volume status is "assigned" as the initially assigned volume by means of the volume initial assignment control subprogram 1165. More specifically, the automatic selection subprogram 1163 changes the volume status of the logical volume from "assigned" to "initially assigned". A path from the target host computer 101 is extended in step 112 in FIG. 13 to the logical volume.

Figure 23:
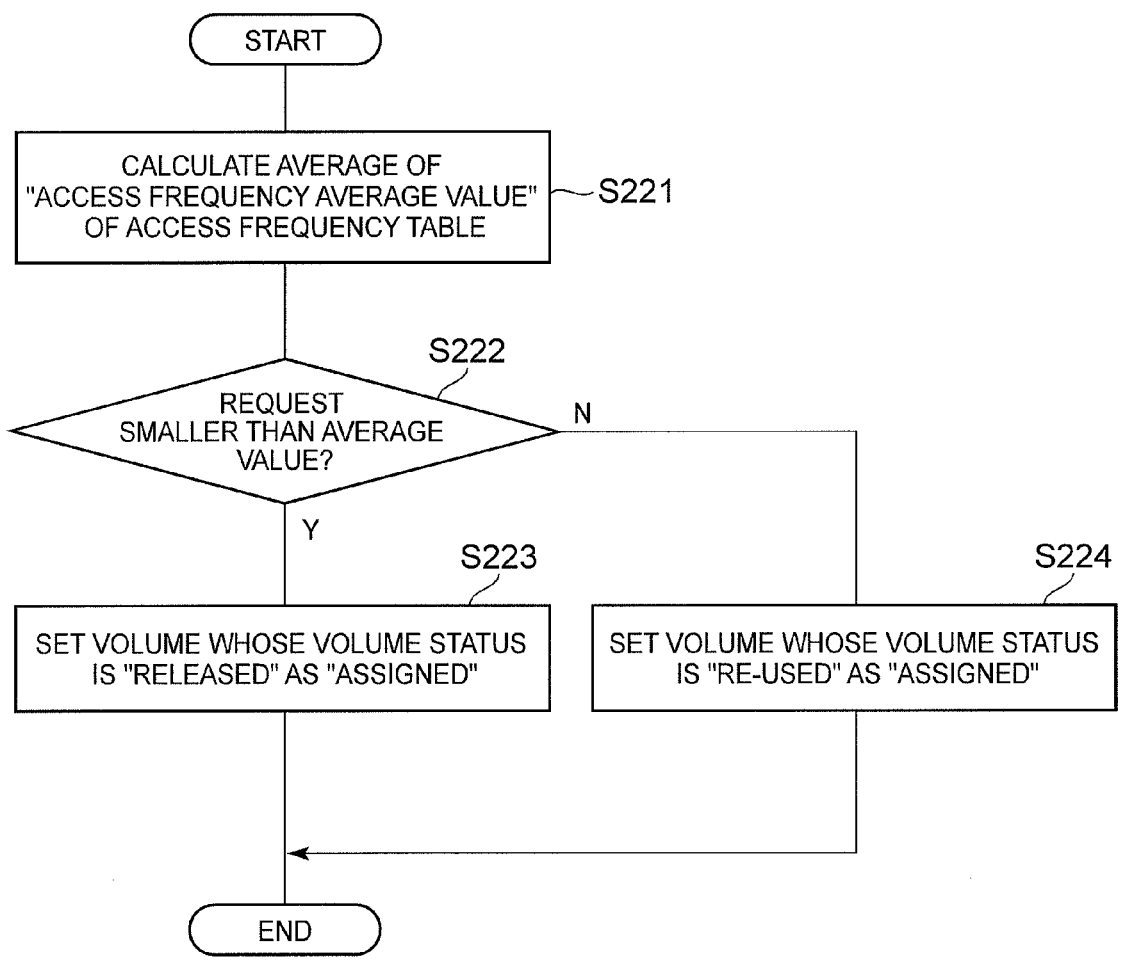
FIG. 23 is a flowchart of the operation of a volume initial assignment control subprogram.

FIG. 23 is a flowchart of the operation of the volume initial assignment control subprogram 1165.

In step 221, the volume initial assignment control subprogram 1165 calculates the average of a plurality of access frequency average values which are recorded in the access frequency table 11596.

In step 222, the volume initial assignment control subprogram 1165 judges whether the access frequency average value of the assignment destination host computer 101 is lower than the average calculated in step 221. If the access frequency average value of the assignment destination host computer 101 is indeed lower, step 223 is executed and, if same is not lower, step 224 is carried out.

In step 223, the volume initial assignment control subprogram 1165 changes the volume status from "released" to "assigned" for a virtual volume whose volume status is "released".

In step 224, the volume initial assignment control subprogram 1165 changes the volume status from "re-used" to "assigned" for the virtual volume whose volume status is "re-used".

In cases where the assigned initially assigned volume is switched from a used target to an unused target, the volume separation control program 1158 is called.

Figure 14:
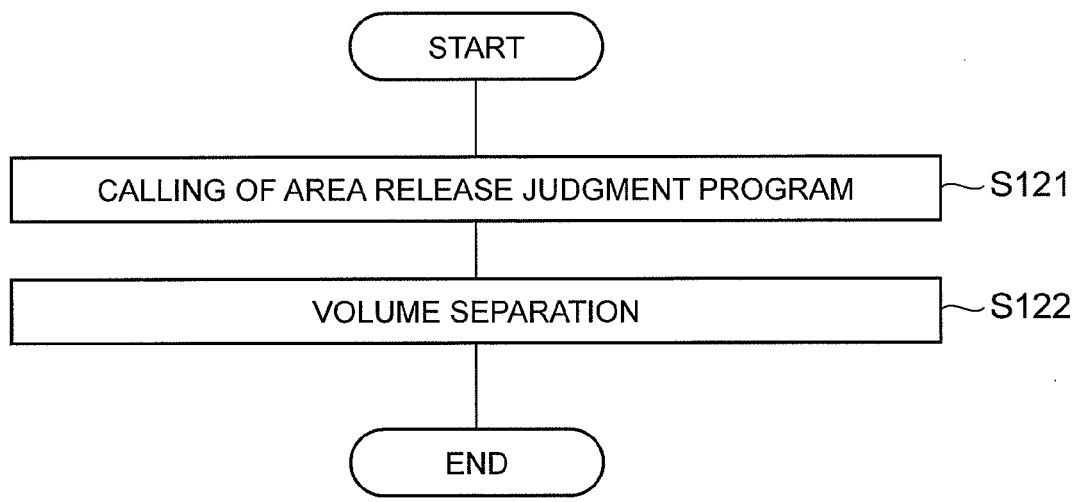
FIG. 14 is a flowchart of the operation of a volume separation control program.

FIG. 14 shows the operation of the volume separation control program 1158.

In step 121, the volume separation control program 1158 calls the area release judgment program 1154. Thereupon, the migration control program 1156 reports the number of the virtual volume 125V which is an initially assigned volume constituting an unused target to the area release judgment program 1154 thus called. As a result, in cases where the unused target initially assigned volume is the virtual volume 125V, it is determined whether all of the real pages assigned to the virtual volume 125V are to be immediately released, released after a fixed time, or whether a state where all of the real pages are assigned rather than being released even when a fixed time has elapsed is to be maintained.

In step 122, the volume separation control program 1158 separates the unused target initially assigned volume from the host computer 101. More specifically, the volume separation control program 1158 transmits a volume separation instruction (an instruction which comprises the identifier of the host computer and the number of the initially assigned volume, for example) to the storage system 121 which comprises the initially assigned volume.

(Case 2) Initial Assignment of Logical Volume was Described Hereinabove.

In (Case 1) above, the response time is referenced when the migration destination volume is selected. In (Case 2) above, the access frequency of the assignment destination host computer is referenced when the initially assigned volume is selected. The measurement of the response time and access frequency will be described hereinbelow.

Figure 15:
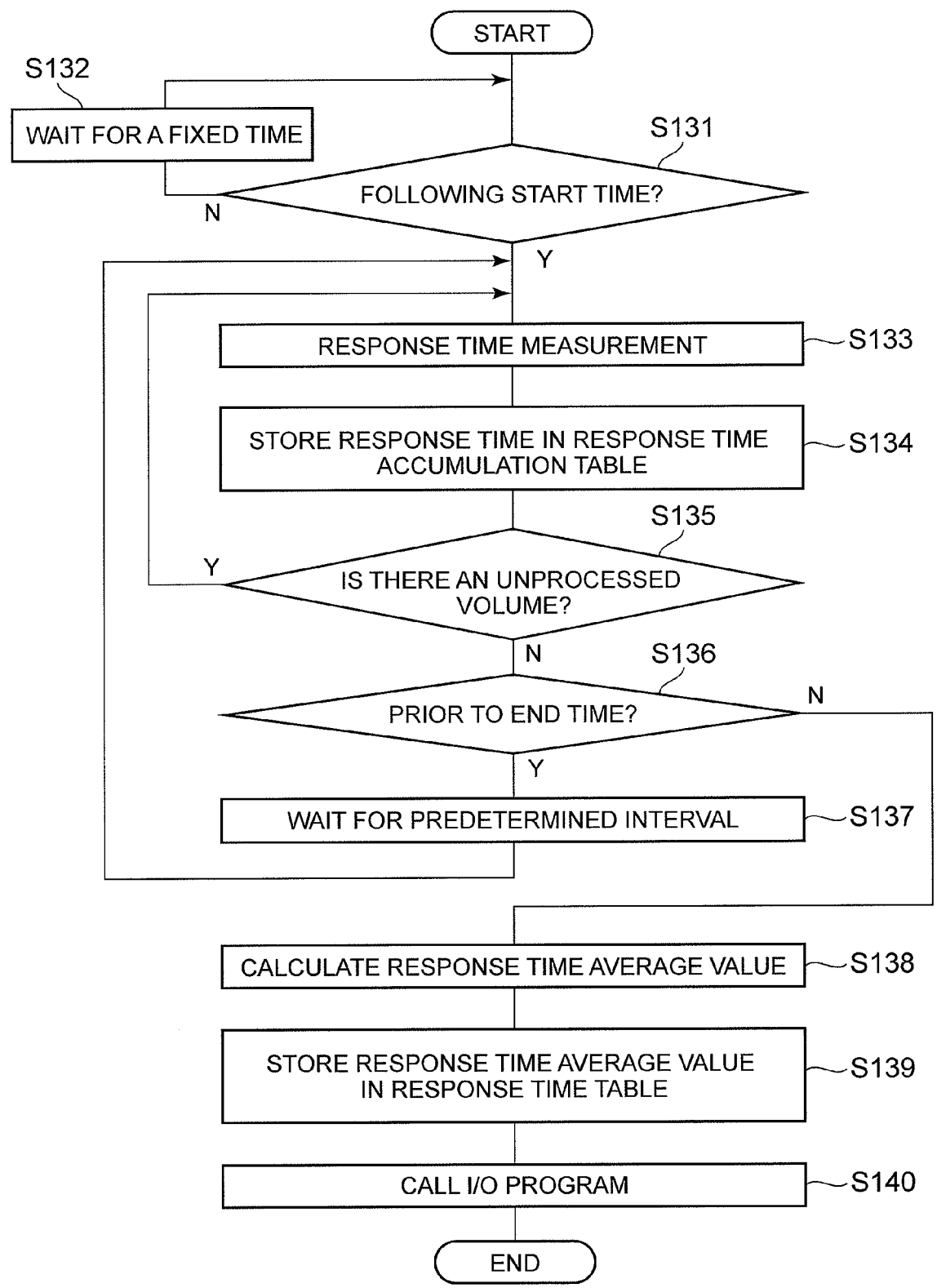
FIG. 15 is a flowchart of the operation of a response time measurement program.

FIG. 15 is a flowchart of the operation of the response time measurement program 1151.

The response times of the respective virtual volumes and respective normal volumes are measured by the response time measurement program 1151. A logical volume which is a response time measurement target will be referred to as a 'measurement target volume' in the description of FIG. 15 hereinbelow.

In step 131, the response time measurement program 1151 judges whether the current time is at or after a predetermined start time. If the current time precedes the start time, step 132 is executed and, if the current time is at or after the start time, step 133 is executed.

In step 132, the response time measurement program 1151 waits for a fixed time. Thereafter, step 131 is executed once again.

In step 133, the response time measurement program 1151 measures the response time of the measurement target volume. More specifically, for example, the response time measurement program 1151 measures the time from when a command designating a measurement target volume is transmitted to the storage system 121 comprising a measurement target volume up until a predetermined response is received.

In step 134, the response time measurement program 1151 stores the measured response time in the response time accumulation table 11597.

In step 135, the response time measurement program 1151 judges whether there is a virtual volume or a normal volume with an unmeasured response time. If it is judged that such a virtual volume or normal volume exists, step 133 is executed for one unmeasured virtual volume or normal volume. If it is judged that there is no such virtual volume or normal volume, step 136 is executed.

In step 136, the response time measurement program 1151 judges whether the current time precedes a predetermined end time. If the current time precedes the end time, step 137 is executed and, if the current time is at or after the end time, step 138 is executed.

In step 137, the response time measurement program 1151 waits for a predetermined interval. Thereafter, step 133 is executed once again.

In step 138, the response time measurement program 1151 calculates the average of a plurality of response times which are recorded in the response time accumulation table 11597 for the respective virtual volumes and the respective normal volumes.

In step 139, the response time measurement program 1151 stores the response time average value thus measured for the respective virtual volumes and the respective normal volumes in the response time table 11598.

In step 140, the response time measurement program 1151 calls the I/O program 1153. As a result, the updated response time accumulation table 11597 and response time table 11598 are stored in the auxiliary storage device (not shown) in the management server 111.

Figure 16:
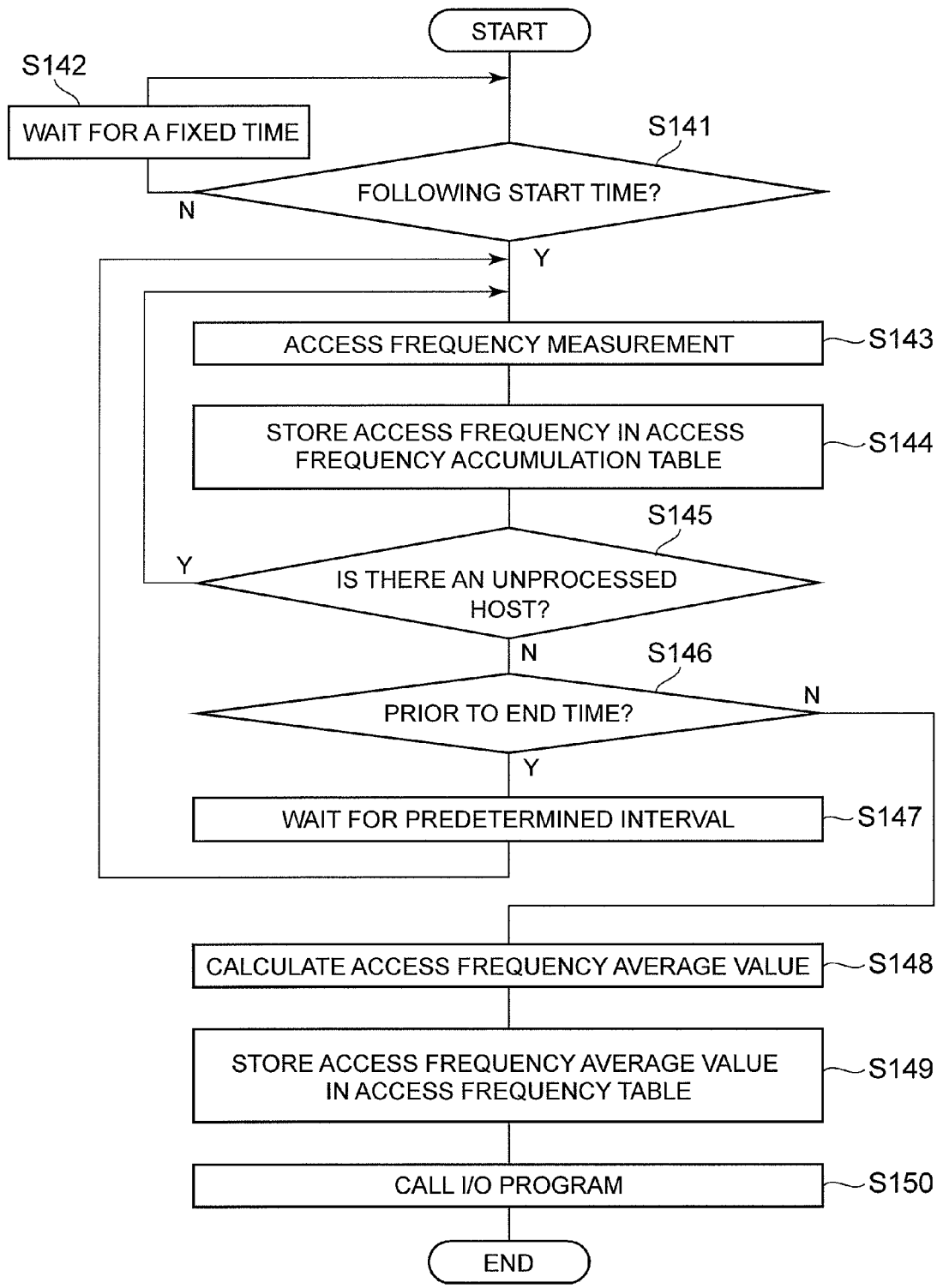
FIG. 16 is a flowchart of the operation of an access frequency measurement program.

FIG. 16 is a flowchart of the operation of the access frequency measurement program 1152.

The access frequency from the respective host computers is measured by the access frequency measurement program 1152. The host computer of the access frequency measurement target will be referred to hereinbelow as the 'measurement target host' in the description of FIG. 16.

In step 141, the access frequency measurement program 1152 judges whether the current time is at or after a predetermined start time. If the current time precedes the start time, step 142 is executed and, if the current time is at or after the start time, step 143 is executed.

In step 142, the access frequency measurement program 1152 waits for a fixed time. Thereafter, step 141 is executed once again.

In step 143, the access frequency measurement program 1152 measures the access frequency of a measurement target host.

In step 144, the access frequency measurement program 1152 stores the measured access frequency in the access frequency accumulation table 11595.

In step 145, the access frequency measurement program 1152 judges whether there is a host computer whose access frequency is unmeasured. If there is such a host computer, step 143 is executed for the one unmeasured host computer. If there is no such host computer, step 146 is executed.

In step 146, the access frequency measurement program 1152 judges whether the current time precedes a predetermined end time. If the current time precedes the end time, step 147 is executed and, if the current time is at or after the end time, step 148 is executed.

In step 147, the access frequency measurement program 1152 waits for a predetermined interval. Thereafter, step 143 is executed once again.

In step 148, the access frequency measurement program 1152 calculates an average of a plurality of access frequencies recorded in the access frequency accumulation table 11595 for the respective host computers.

In step 149, the access frequency measurement program 1152 stores the calculated access frequency average value in the access frequency table 11596 for the respective host computers.

In step 150, the access frequency measurement program 1152 calls the I/O program 1153. As a result, the updated access frequency accumulation table 11595 and access frequency table 11596 are stored in the auxiliary storage device (not shown) in the management server 111.

The embodiment of the present invention is an illustration of the description of the present invention and is not intended to limit the scope of the present invention to this embodiment. The present invention can also be implemented in various other forms without departing from the spirit of the present invention.

For example, the processing flow that appears in at least one of FIGS. 12 to 23 provides an overview of the respective processes to the extent required to understand and implement the present invention. Therefore, a so-called person skilled in the art is able to change the order of the steps and to change the steps into other steps to an extent not departing from the scope of the present invention.

What is claimed is:

1. A computer which manages a storage system having a function to assign a real storage area to a virtual storage area specified by an access request,
    wherein the virtual storage area specified by the access request is one of a plurality of virtual storage areas which constitute the virtual volume;
    the assigned real storage area is an unassigned real storage area which has not been assigned to any virtual storage area among a plurality of real storage areas which constitute a storage area pool constituted by one or a plurality of real volumes;
    the virtual volume is a virtual logical volume;
    the real volume is a logical volume which is formed on the basis of the storage space of one or a plurality of physical storage devices of the storage system; and
    the computer comprises:
    a non-transitory memory;
    a specification module stored in the memory which specifies a virtual volume which is switched from a used target to an unused target;
    a release/non-release selection module stored in the memory which performs a release/non-release selection determining whether or not to release all of the real storage areas assigned to the specified virtual volume; and
    a release/non-release instruction module stored in the memory which creates a release/non-release instruction for controlling whether or not the storage system releases all of the real storage areas assigned to the specified virtual volume in accordance with the result of the release/non-release selection and transmits the created release/non-release instruction
    a virtual volume selection module stored in the memory which selects a virtual volume which constitutes an assignment target from a plurality of virtual volumes on the basis of whether the virtual volume is a virtual volume for which all of the real storage areas have been released;
    wherein the virtual volume selection module prioritizes the selection of a virtual volume for which all of the assigned real storage areas are released in cases where a virtual volume which is assigned to a higher level device with a low access frequency is selected and prioritizes the selection of a virtual volume for which all of the assigned real storage areas have not been released in cases where a virtual volume which is assigned to a higher level device with a high access frequency is selected.

2. The computer according to claim 1, wherein the virtual volume which is the assignment target is the virtual volume (A) or (B) below:
    (A) an assignment target virtual volume as the migration destination of data which are stored in a migration source logical volume; and
    (B) an assignment target virtual volume for a higher-level device which issues an access request to the storage system.

3. The computer according to claim 2, wherein the virtual volume selected as the virtual volume (A) conforms to condition (A1) and (A2) below:
    (A1) all of the assigned real storage areas have not been released; and
    (A2) the virtual volume has a storage capacity equal to or greater than the storage capacity of the migration source logical volume.

4. The computer according to claim 3, wherein the virtual volume which is selected as the virtual volume (A) also conforms to condition (A3) and/or (A4) below:
    (A3) the virtual volume has a volume performance which is as close as possible to the volume performance of the migration source logical volume; and
    (A4) the time the virtual volume was switched from the used target to the unused target is the oldest.

5. The computer according to claim 4, wherein the volume performance of a certain logical volume is a value which is calculated on the basis of a plurality of response times for the certain logical volume; and
    the response time for the certain logical volume is a time interval which extends from the time the request designating the certain logical volume is issued until receipt of a response.

6. The computer according to claim 1, wherein the release/non-release selection module performs a release/non-release selection determining whether or not to release all of the real storage areas assigned to the specified virtual volume on the basis of the usage status prior to switching the specified virtual volume to an unused target.

7. The computer according to claim 1, wherein the release/non-release selection module performs a release/non-release selection determining whether or not to release all of the real storage areas assigned to the specified virtual volume on the basis of the performance of the real volume which comprises the real storage areas assigned to the specified virtual volume.

8. The computer according to claim 1, wherein the release/non-release selection module performs a release/non-release selection determining whether or not to release all of the real storage areas assigned to the specified virtual volume on the basis of the performance of the specified virtual volume.

9. The computer according to claim 1, wherein the release/non-release selection module performs a release/non-release selection determining whether or not to release all of the real storage areas assigned to the specified virtual volume on the basis of the number of unassigned real storage areas.

10. A method of controlling a storage system having a function to assign a real storage area to a virtual storage area specified by an access request,
wherein the virtual storage area specified by the access request is one of a plurality of virtual storage areas which constitute a virtual volume; the assigned real storage area is an unassigned real storage area which has not been assigned to any virtual storage area among a plurality of real storage areas which constitute the storage area pool constituted by one or a plurality of real volumes; the virtual volume is a virtual logical volume; and the real volume is a logical volume which is formed on the basis of the storage space of one or a plurality of physical storage devices of the storage system,
the control method comprising:
specifying a virtual volume which has been switched from a used target to an unused target;
performing a release/non-release selection determining whether or not to release all of the real storage areas assigned to the specified virtual volume;
controlling whether or not the storage system releases all of the real storage areas assigned to the specified virtual volume in accordance with the result of the release/non-release selection; and
selecting a virtual volume which constitutes an assignment target from a plurality of virtual volumes on the basis of whether the virtual volume is a virtual volume for which all of the real storage areas have been released;
wherein the virtual volume selection prioritizes the selection of a virtual volume for which all of the assigned real storage areas are released in cases where a virtual volume which is assigned to a higher level device with a low access frequency is selected and prioritizes the selection of a virtual volume for which all of the assigned real storage areas have not been released in cases where a virtual volume which is assigned to a higher level device with a high access frequency is selected.

11. A non-transitory computer-readable medium having stored thereon a computer program for controlling a storage system having a function to assign a real storage area to a virtual storage area which is specified by an access request,
wherein the virtual storage area specified by the access request is one of a plurality of virtual storage areas which constitute a virtual volume; the assigned real storage area is an unassigned real storage area which has not been assigned to any virtual storage area among a plurality of real storage areas which constitute a storage area pool constituted by one or a plurality of real volumes; the virtual volume is a virtual logical volume;
and the real volume is a logical volume formed on the basis of a storage space of one or a plurality of physical storage devices of the storage system,
the computer program causing a computer to execute the following steps of:
specifying a virtual volume switched from a used target to an unused target;
performing a release/non-release selection determining whether or not to release all of the real storage areas assigned to the specified virtual volume; and creating a release/non-release instruction for controlling whether or not the storage system releases all of the real storage areas assigned to the specified virtual volume in accordance with the result of the release/non-release selection and transmitting the created release/non-release instruction; and
selecting a virtual volume which constitutes an assignment target from a plurality of virtual volumes on the basis of whether the virtual volume is a virtual volume for which all of the real storage areas have been released;
wherein the virtual volume selection prioritizes the selection of a virtual volume for which all of the assigned real storage areas are released in cases where a virtual volume which is assigned to a higher level device with a low access frequency is selected and prioritizes the selection of a virtual volume for which all of the assigned real storage areas have not been released in cases where a virtual volume which is assigned to a higher level device with a high access frequency is selected.

12. A storage system having a function to assign a real storage area to a virtual storage area specified by an access request, wherein the virtual storage area specified by the access request is one of a plurality of virtual storage areas which constitute a virtual volume;
the assigned real storage area is an unassigned real storage area which has not been assigned to any virtual storage area among a plurality of real storage areas which constitute a storage area pool which is constituted by one or a plurality of real volumes;
the virtual volume is a virtual logical volume;
the real volume is a logical volume which is formed on the basis of the storage space of one or a plurality of physical storage devices of the storage system; and
the storage system comprises:
a non-transitory memory;
a specification module stored in the memory which specifies a virtual volume which is switched from a used target to an unused target;
a release/non-release selection module stored in the memory which performs a release/non-release selection determining whether or not to release all of the real storage areas assigned to the specified virtual volume;
a release/non-release control module stored in the memory which controls whether or not the storage system releases all of the real storage areas assigned to the specified virtual volume in accordance with the result of the release/non-release selection; and
a virtual volume selection module stored in the memory which selects a virtual volume which constitutes an assignment target from a plurality of virtual volumes on the basis of whether the virtual volume is a virtual volume for which all of the real storage areas have been released;
wherein the virtual volume selection prioritizes the selection of a virtual volume for which all of the assigned real storage areas are released in cases where a virtual volume which is assigned to a higher level device with a low access frequency is selected and prioritizes the selection of a virtual volume for which all of the assigned real storage areas have not been released in cases where a virtual volume which is assigned to a higher level device with a high access frequency is selected.

13. A computer which manages a storage system having a function to assign a real storage area to a virtual storage area specified by an access request, wherein the virtual storage area specified by the access request is one of a plurality of virtual storage areas which constitute the virtual volume;

the assigned real storage area is an unassigned real storage area which has not been assigned to any virtual storage area among a plurality of real storage areas which constitute a storage area pool constituted by one or a plurality of real volumes;

the virtual volume is a virtual logical volume;

the real volume is a logical volume which is formed on the basis of the storage space of one or a plurality of physical storage devices of the storage system; and the computer comprises:

a non-transitory memory;

a specification module stored in the memory which specifies a virtual volume which is switched from a used target to an unused target;

a release/non-release selection module stored in the memory which performs a release/non-release selection determining whether or not to release all of the real storage areas assigned to the specified virtual volume;

a release/non-release instruction module stored in the memory which creates a release/non-release instruction for controlling whether or not the storage system releases all of the real storage areas assigned to the specified virtual volume in accordance with the result of the release/non-release selection and transmits the created release/non-release instruction; and a virtual volume selection module stored in the memory which selects a virtual volume which constitutes an assignment target from a plurality of virtual volumes on the basis of whether the virtual volume is a virtual volume for which all of the real storage areas have been released; and wherein the virtual volume selection module judges whether automatic selection or user selection of the virtual volume is implemented and, in cases where automatic selection is implemented, selects a virtual volume which constitutes an assignment target from a plurality of virtual volumes on the basis of whether the virtual volume is a virtual volume for which all of the real storage areas have been released and, in cases where user selection is implemented, displays a status which relates to whether all of the real storage areas are released for the respective virtual volumes and selects a virtual volume which is designated by an administrator in response to the display of the status of the respective virtual volumes as the assignment target virtual volume.

14. A method of controlling a storage system having a function to assign a real storage area to a virtual storage area specified by an access request, wherein the virtual storage area specified by the access request is one of a plurality of virtual storage areas which constitute a virtual volume; the assigned real storage area is an unassigned real storage area which has not been assigned to any virtual storage area among a plurality of real storage areas which constitute the storage area pool constituted by one or a plurality of real volumes; the virtual volume is a virtual logical volume; and the real volume is a logical volume which is formed on the basis of the storage space of one or a plurality of physical storage devices of the storage system, the control method comprising:

specifying a virtual volume which has been switched from a used target to an unused target;

performing a release/non-release selection determining whether or not to release all of the real storage areas assigned to the specified virtual volume;

controlling whether or not the storage system releases all of the real storage areas assigned to the specified virtual volume in accordance with the result of the release/non-release selection; and a virtual volume selection module stored in the memory which selects a virtual volume which constitutes an assignment target from a plurality of virtual volumes on the basis of whether the virtual volume is a virtual volume for which all of the real storage areas have been released;

wherein the virtual volume selection module judges whether automatic selection or user selection of the virtual volume is implemented and, in cases where automatic selection is implemented, selects a virtual volume which constitutes an assignment target from a plurality of virtual volumes on the basis of whether the virtual volume is a virtual volume for which all of the real storage areas have been released and, in cases where user selection is implemented, displays a status which relates to whether all of the real storage areas are released for the respective virtual volumes and selects a virtual volume which is designated by an administrator in response to the display of the status of the respective virtual volumes as the assignment target virtual volume.

15. A non-transitory computer-readable medium having stored thereon a computer program for controlling a storage system having a function to assign a real storage area to a virtual storage area which is specified by an access request, wherein the virtual storage area specified by the access request is one of a plurality of virtual storage areas which constitute a virtual volume; the assigned real storage area is an unassigned real storage area which has not been assigned to any virtual storage area among a plurality of real storage areas which constitute a storage area pool constituted by one or a plurality of real volumes; the virtual volume is a virtual logical volume; and the real volume is a logical volume formed on the basis of a storage space of one or a plurality of physical storage devices of the storage system, the computer program causing a computer to execute the following steps of:

specifying a virtual volume switched from a used target to an unused target;

performing a release/non-release selection determining whether or not to release all of the real storage areas assigned to the specified virtual volume; and creating a release/non-release instruction for controlling whether or not the storage system releases all of the real storage areas assigned to the specified virtual volume in accordance with the result of the release/non-release selection and transmitting the created release/non-release instruction; and selecting a virtual volume which constitutes an assignment target from a plurality of virtual volumes on the basis of whether the virtual volume is a virtual volume for which all of the real storage areas have been released;

wherein the virtual volume selection module judges whether automatic selection or user selection of the virtual volume is implemented and, in cases where automatic selection is implemented, selects a virtual volume which constitutes an assignment target from a plurality of virtual volumes on the basis of whether the virtual volume is a virtual volume for which all of the real storage areas have been released and, in cases where user selection is implemented, displays a status which relates to whether all of the real storage areas are released for the respective virtual volumes and selects a virtual volume which is designated by an administrator in response to the display of the status of the respective virtual volumes as the assignment target virtual volume.

16. A storage system having a function to assign a real storage area to a virtual storage area specified by an access request, wherein the virtual storage area specified by the access request is one of a plurality of virtual storage areas which constitute a virtual volume;
   the assigned real storage area is an unassigned real storage area which has not been assigned to any virtual storage area among a plurality of real storage areas which constitute a storage area pool which is constituted by one or a plurality of real volumes;
   the virtual volume is a virtual logical volume;
   the real volume is a logical volume which is formed on the basis of the storage space of one or a plurality of physical storage devices of the storage system; and
   the storage system comprises:
   a non-transitory memory;
   a specification module stored in the memory which specifies a virtual volume which is switched from a used target to an unused target;
   a release/non-release selection module stored in the memory which performs a release/non-release selection determining whether or not to release all of the real storage areas assigned to the specified virtual volume; and
   a release/non-release control module stored in the memory which controls whether or not the storage system releases all of the real storage areas assigned to the specified virtual volume in accordance with the result of the release/non-release selection; and
   a virtual volume selection module stored in the memory which selects a virtual volume which constitutes an assignment target from a plurality of virtual volumes on the basis of whether the virtual volume is a virtual volume for which all of the real storage areas have been released;
   wherein the virtual volume selection module judges whether automatic selection or user selection of the virtual volume is implemented and, in cases where automatic selection is implemented, selects a virtual volume which constitutes an assignment target from a plurality of virtual volumes on the basis of whether the virtual volume is a virtual volume for which all of the real storage areas have been released and, in cases where user selection is implemented, displays a status which relates to whether all of the real storage areas are released for the respective virtual volumes and selects a virtual volume which is designated by an administrator in response to the display of the status of the respective virtual volumes as the assignment target virtual volume.

* * * * *